US009323171B2

(12) United States Patent
Itami et al.

(10) Patent No.: US 9,323,171 B2
(45) Date of Patent: Apr. 26, 2016

(54) OPTICAL SCANNING DEVICE INCLUDING A ROTATING POLYGON MIRROR AND IMAGE FORMING APPARATUS INCORPORATING SAME

(71) Applicants: Yukio Itami, Kanagawa (JP); Yukihisa Yokoyama, Kanagawa (JP); Naoki Miyatake, Kanagawa (JP)

(72) Inventors: Yukio Itami, Kanagawa (JP); Yukihisa Yokoyama, Kanagawa (JP); Naoki Miyatake, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/503,556

(22) Filed: Oct. 1, 2014

(65) Prior Publication Data

US 2015/0097910 A1  Apr. 9, 2015

(30) Foreign Application Priority Data

Oct. 9, 2013 (JP) .................................. 2013-211521

(51) Int. Cl.
| | |
|---|---|
| B41J 2/435 | (2006.01) |
| B41J 2/47 | (2006.01) |
| G03G 15/043 | (2006.01) |
| G02B 26/12 | (2006.01) |
| G02B 27/00 | (2006.01) |

(52) U.S. Cl.
CPC ............ G03G 15/043 (2013.01); G02B 26/123 (2013.01); G02B 26/124 (2013.01); G02B 27/0018 (2013.01)

(58) Field of Classification Search
CPC .. G02B 13/0005; G02B 26/12; G02B 26/123; G02B 26/124; B41J 2/44; B41J 2/442; B41J 2/47; B41J 2/471; B41J 2/473

USPC ................. 347/229, 231–233, 235, 238, 250, 347/259–261

See application file for complete search history.

(56) References Cited

U.S. PATENT DOCUMENTS

| | | | |
|---|---|---|---|
| 5,069,515 A | 12/1991 | Itami et al. | |
| 5,680,254 A | 10/1997 | Ueda et al. | |
| 5,726,699 A | 3/1998 | Itami et al. | |
| 5,739,602 A | 4/1998 | Suzuki et al. | |

(Continued)

FOREIGN PATENT DOCUMENTS

| | | |
|---|---|---|
| JP | 10-206778 | 8/1998 |
| JP | 2003-279877 | 10/2003 |
| JP | 2005-092129 | 4/2005 |

OTHER PUBLICATIONS

U.S. Appl. No. 08/241,582, filed May 12, 1994.

*Primary Examiner* — Hai C Pham
(74) *Attorney, Agent, or Firm* — Oblon, McClelland, Maier & Neustadt, L.L.P.

(57) ABSTRACT

An optical scanning device including a light source and a rotating polygon mirror having a plurality of reflective surfaces scans a scan area of a surface in a main scanning direction with the light flux emitted from the light source and reflected by the rotating polygon mirror. All the light flux is reflected by a first reflective surface when light flux deflected by the rotating polygon mirror is directed onto a center position of the scan area, and a part of the light flux incident to the rotating polygon mirror is reflected by a second reflective surface adjacent to the first reflective surface when light flux reflected by the rotating polygon mirror is directed onto at least one end of both ends of the scan area and the light flux obliquely enters a plane perpendicular to a rotation axis of the rotating polygon mirror.

7 Claims, 27 Drawing Sheets

(56) References Cited

U.S. PATENT DOCUMENTS

| | | | |
|---|---|---|---|
| 5,769,544 A | 6/1998 | Suzuki et al. | |
| 6,580,186 B1 | 6/2003 | Suzuki et al. | |
| 7,884,842 B2* | 2/2011 | Ishihara | 347/235 |
| 8,026,941 B2* | 9/2011 | Kim | 347/261 |
| RE42,865 E | 10/2011 | Suzuki et al. | |
| 2002/0001118 A1 | 1/2002 | Nakajima et al. | |
| 2002/0130948 A1 | 9/2002 | Itami et al. | |
| 2002/0149666 A1 | 10/2002 | Amada et al. | |
| 2003/0156310 A1 | 8/2003 | Suzuki et al. | |
| 2003/0160529 A1 | 8/2003 | Suzuki et al. | |
| 2003/0206322 A1 | 11/2003 | Atsuumi et al. | |
| 2003/0214693 A1 | 11/2003 | Hayashi et al. | |
| 2004/0001241 A1 | 1/2004 | Hayashi et al. | |
| 2004/0165240 A1 | 8/2004 | Suzuki et al. | |
| 2004/0184127 A1 | 9/2004 | Nakajima et al. | |
| 2004/0240000 A1 | 12/2004 | Miyatake et al. | |
| 2005/0094234 A1 | 5/2005 | Miyatake et al. | |
| 2005/0099663 A1 | 5/2005 | Hayashi | |
| 2005/0225819 A1 | 10/2005 | Atsuumi et al. | |
| 2006/0000990 A1 | 1/2006 | Hayashi et al. | |
| 2006/0061847 A1 | 3/2006 | Itami | |
| 2006/0203264 A1 | 9/2006 | Miyatake | |
| 2006/0208179 A1 | 9/2006 | Itami | |
| 2006/0209166 A1 | 9/2006 | Suzuki et al. | |
| 2006/0209377 A1 | 9/2006 | Atsuumi et al. | |
| 2006/0291026 A1 | 12/2006 | Miyatake | |
| 2007/0002417 A1* | 1/2007 | Hirakawa et al. | 359/204 |
| 2007/0030538 A1 | 2/2007 | Hirakawa et al. | |
| 2007/0081216 A1 | 4/2007 | Miyatake | |
| 2007/0146849 A1 | 6/2007 | Miyatake et al. | |
| 2007/0146852 A1 | 6/2007 | Itami | |
| 2007/0153349 A1 | 7/2007 | Itami et al. | |
| 2007/0215800 A1 | 9/2007 | Miyatake et al. | |
| 2007/0216754 A1 | 9/2007 | Miyatake | |
| 2008/0062491 A1 | 3/2008 | Nakamura et al. | |
| 2008/0062493 A1 | 3/2008 | Miyatake | |
| 2008/0068691 A1 | 3/2008 | Miyatake | |
| 2008/0174843 A1 | 7/2008 | Masuda et al. | |
| 2008/0180772 A1 | 7/2008 | Miyatake et al. | |
| 2008/0204539 A1 | 8/2008 | Itami et al. | |
| 2009/0073528 A1 | 3/2009 | Miyatake | |
| 2009/0168132 A1 | 7/2009 | Miyatake | |
| 2009/0231659 A1 | 9/2009 | Masuda et al. | |
| 2010/0091083 A1 | 4/2010 | Itami et al. | |
| 2011/0063703 A1* | 3/2011 | Ishibe | 359/204.1 |
| 2011/0063704 A1 | 3/2011 | Miyatake | |
| 2012/0056968 A1 | 3/2012 | Imai et al. | |
| 2012/0177409 A1 | 7/2012 | Arai et al. | |
| 2012/0182367 A1 | 7/2012 | Masuda et al. | |
| 2012/0236380 A1 | 9/2012 | Miyatake et al. | |
| 2013/0083148 A1 | 4/2013 | Miyatake et al. | |
| 2013/0147895 A1 | 6/2013 | Miyatake | |
| 2013/0188992 A1 | 7/2013 | Itami | |
| 2013/0201536 A1 | 8/2013 | Nakamura et al. | |
| 2013/0235143 A1 | 9/2013 | Itami et al. | |
| 2014/0009555 A1* | 1/2014 | Itami et al. | 347/261 |
| 2014/0204166 A1 | 7/2014 | Itami et al. | |

* cited by examiner

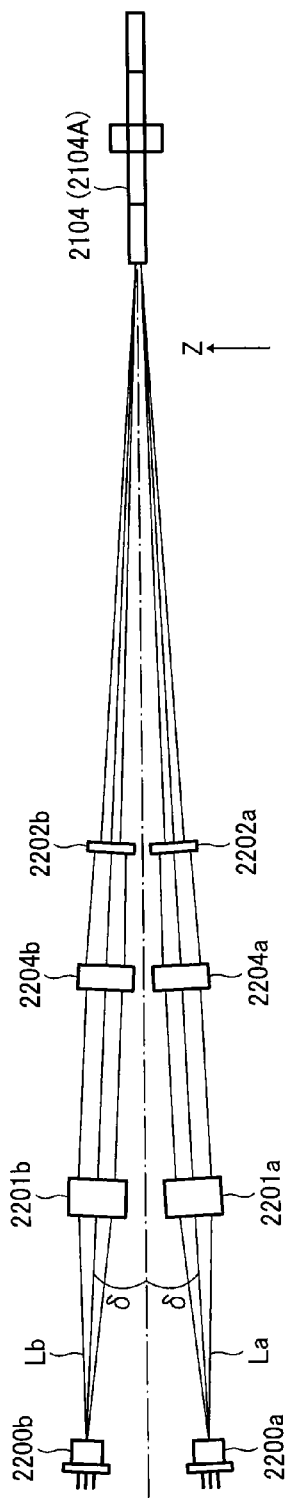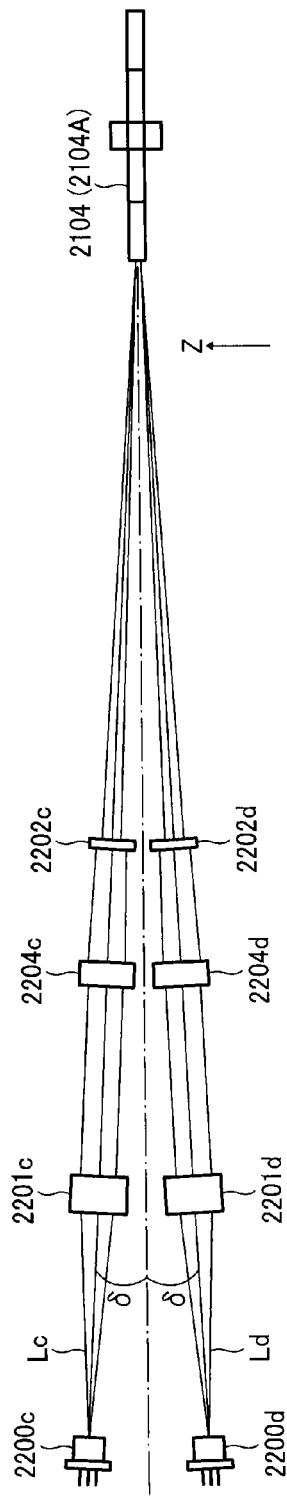

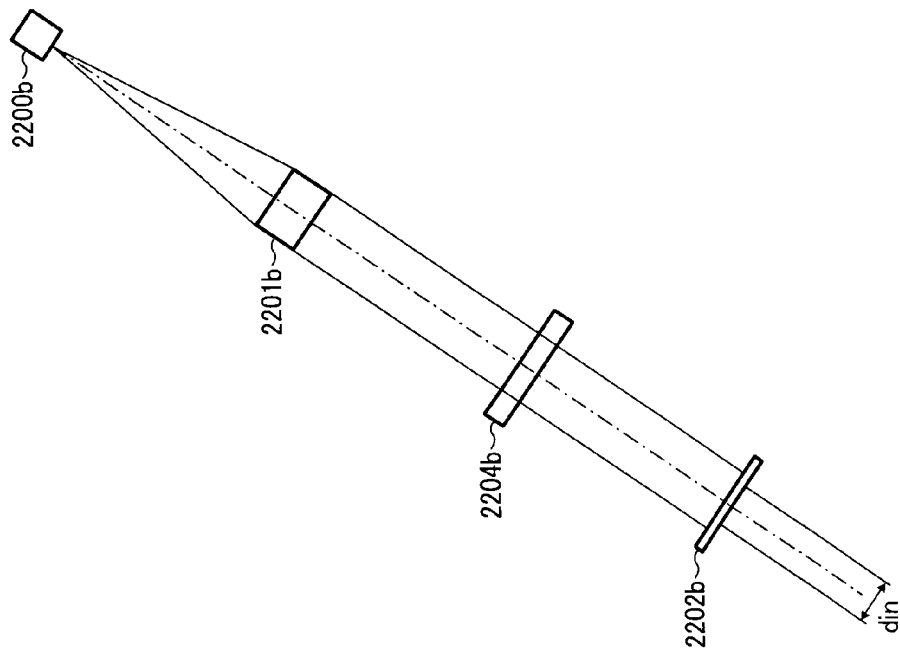
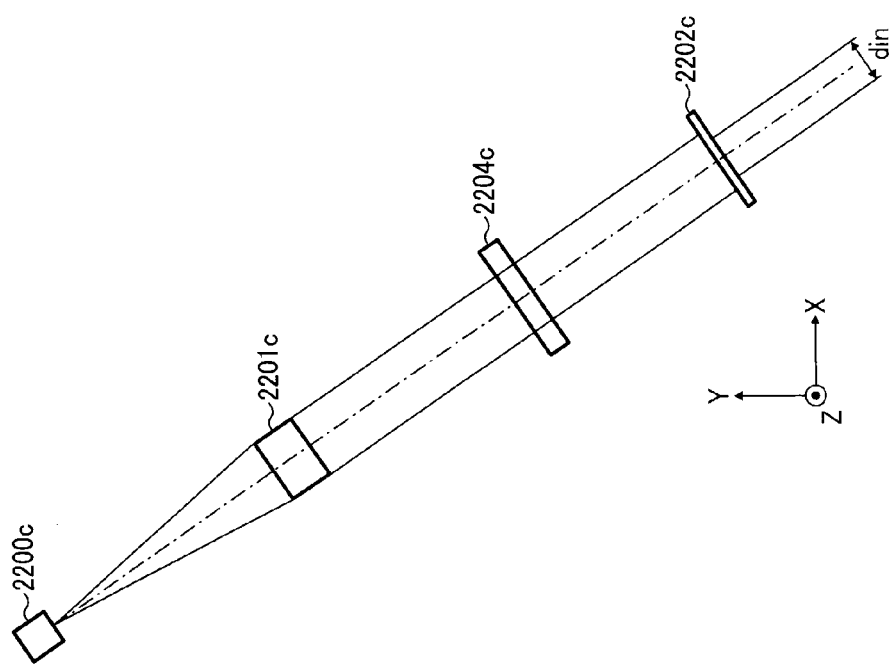
FIG. 8

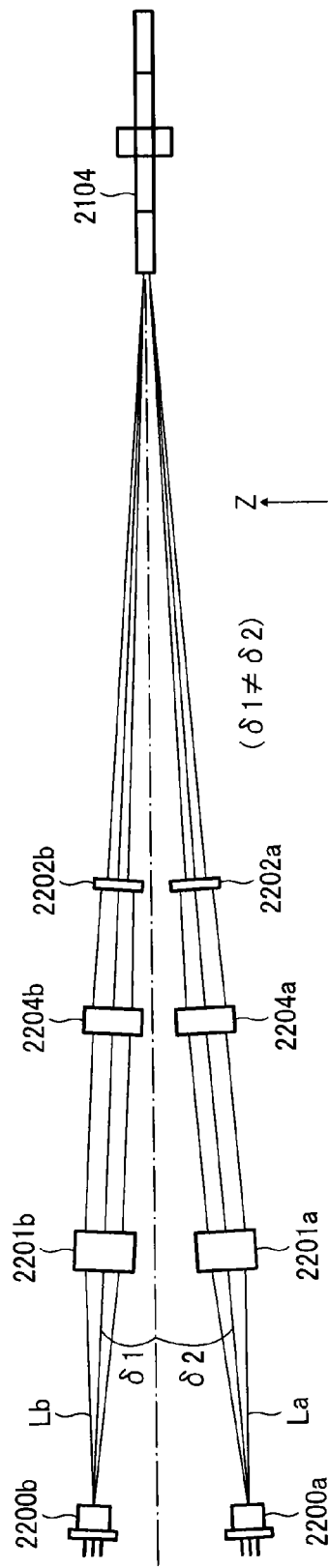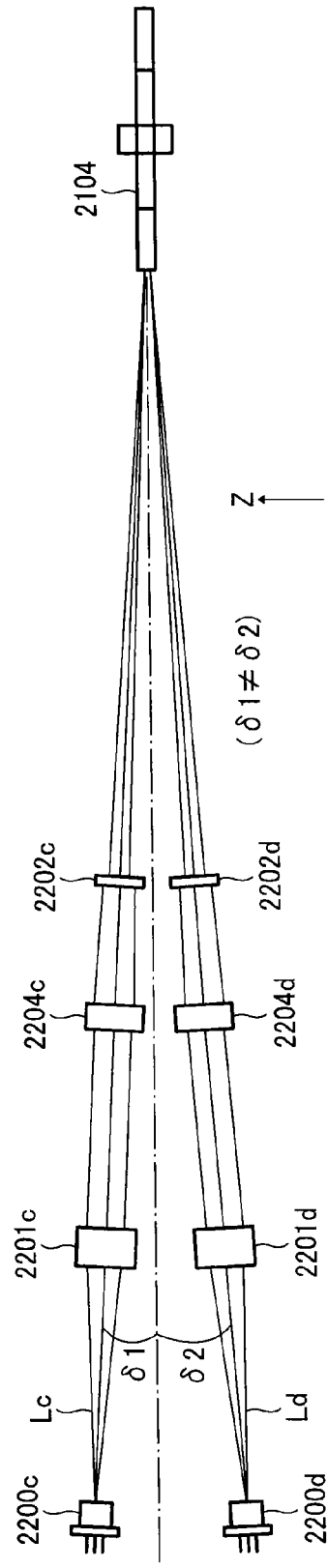

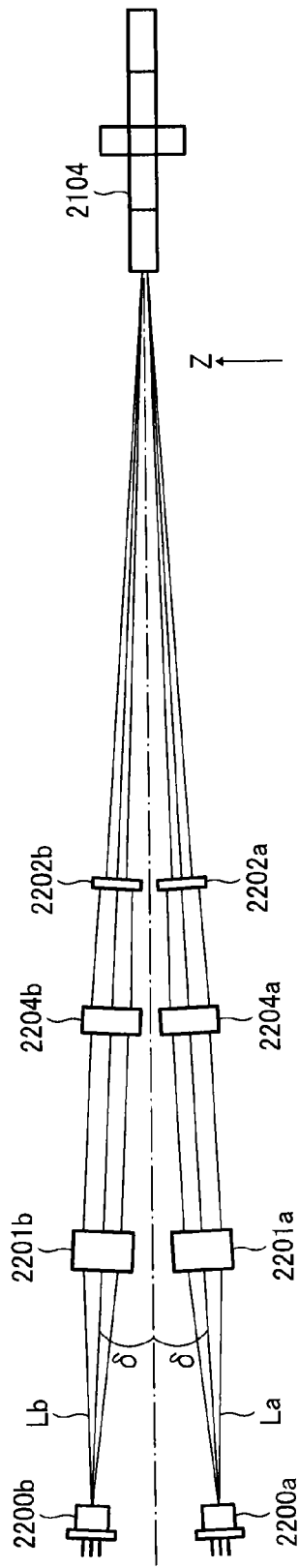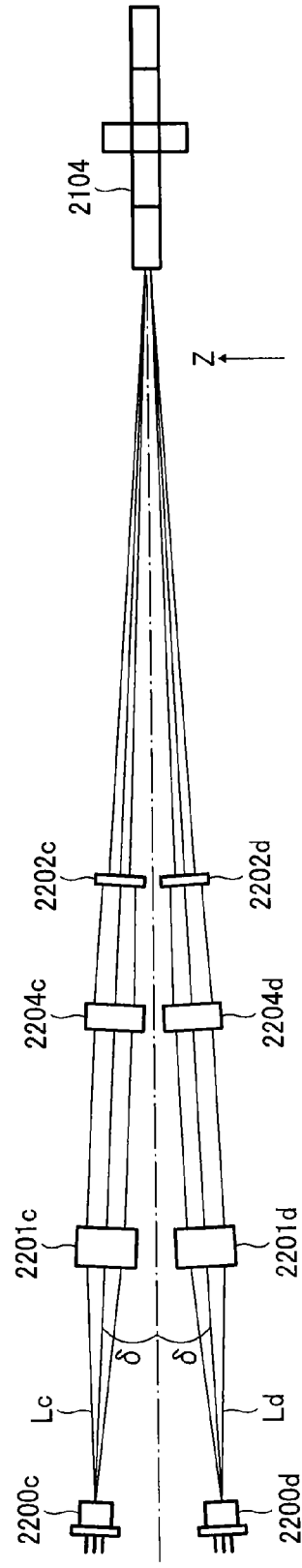

OPTICAL SCANNING DEVICE INCLUDING A ROTATING POLYGON MIRROR AND IMAGE FORMING APPARATUS INCORPORATING SAME

CROSS-REFERENCE TO RELATED APPLICATION

The present application claims priority pursuant to 35 U.S.C. §119(a) from Japanese patent application number 2013-211521, filed on Oct. 9, 2013, the entire disclosure of which is hereby incorporated by reference herein.

BACKGROUND

1. Technical Field

Exemplary embodiments of the present invention relate to an optical scanning device and an image forming apparatus incorporating the optical scanning device, and in particular, to an optical scanning device to scan a surface with light beams and an image forming apparatus incorporating such an optical scanning device.

2. Background Art

Many image forming apparatuses employing electrophotography often employ laser technology. In general, this type of image forming apparatus includes an optical scanning device that scans a surface of a photosensitive drum (hereinafter, to be referred to as a "photoreceptor drum") with laser beams, thereby forming a latent image on the surface of the photosensitive drum.

The optical scanning device includes a light source, an optical system, a deflector, a rotating polygon mirror, and a scanning optical system. The laser beams emitted from the light source enter the rotating polygon mirror via the optical system before the deflector, are deflected by a reflective surface of the rotating polygon mirror, and directed onto the photoreceptor drum via the scanning optical system. Note that the reflective surface of the rotating polygon mirror is also referred to as a "deflection surface".

There are two methods to have the laser beams enter the rotating polygon mirror, that is, an underfilled type and an overfilled type. The underfilled type is referred to as a "UF type" and the overfilled type an "OF type."

In the UF type system, a width of the incident light beam is shorter than a length of the deflection surface relative to a main scanning direction. In this case, all the incident light beam is directed onto the photoreceptor drum. By contrast, in the OF type system, a width of the incident light beam is greater than a length of the deflection surface relative to the main scanning direction. In this case, ambient light around the incident light is not directed onto the photoreceptor drum.

Recently, requirements for a more compact and higher-speed image forming apparatus have become acute. Thus, similarly, a more compact and higher-speed optical device has been required.

However, in the conventional optical scanning device, the more compact and higher-speed optical scanning device has been difficult to be produced without degrading image quality.

SUMMARY

In one embodiment of the disclosure, there is provided an improved optical scanning device including a light source to emit light flux and a rotating polygon mirror having a plurality of reflective surfaces and rotatable in a clockwise direction. The optical scanning device scans a scan area of a surface in a main scanning direction by the light flux emitted from the light source and reflected by the rotating polygon mirror, and when the light flux is orthogonally projected to a plane perpendicular to a rotation axis of the rotating polygon mirror, a width of the light flux that enters the rotating polygon mirror is smaller than a length in the main scanning homologous direction of the reflective surface of the rotating polygon mirror, all the light flux incident to the rotating polygon mirror is reflected by a first reflective surface when light flux deflected by the rotating polygon mirror is directed onto a center position of the scan area, a part of the light flux incident to the rotating polygon mirror is reflected by a second reflective surface adjacent to the first reflective surface when the light flux reflected by the rotating polygon mirror is directed onto at least one end of both ends of the scan area, and the rest of the light flux is reflected by the first reflective surface, and the light flux incident to the rotating polygon mirror obliquely enters the plane orthogonal to a rotation axis of the rotating polygon mirror. There is also provided an image forming apparatus including an image carrier and the above-described optical scanning device to scan the image carrier with light flux modulated by image information.

These and other objects, features, and advantages of the present invention will become apparent upon consideration of the following description of the preferred embodiments of the present invention when taken in conjunction with the accompanying drawings.

BRIEF DESCRIPTION OF THE DRAWINGS

FIG. 3 schematically illustrates another structure of an optical scanning device in FIG. 1;

FIG. 4 schematically illustrates still another structure of an optical scanning device in FIG. 1;

FIG. 8 is a view illustrating a width din of the light flux incident to the light deflector;

FIG. 24 illustrates a first modified example of the optical scanning device;

FIG. 25 additionally illustrates the first modified example of the optical scanning device of FIG. 24;

FIG. 30 illustrates the second comparative example of the optical scanning device;

FIG. 31 additionally illustrates the second comparative example of the optical scanning device of FIG. 30;

DETAILED DESCRIPTION

Hereinafter, preferred embodiments of the present invention will be described with reference to FIGS. 1 to 23.

Figure 1:
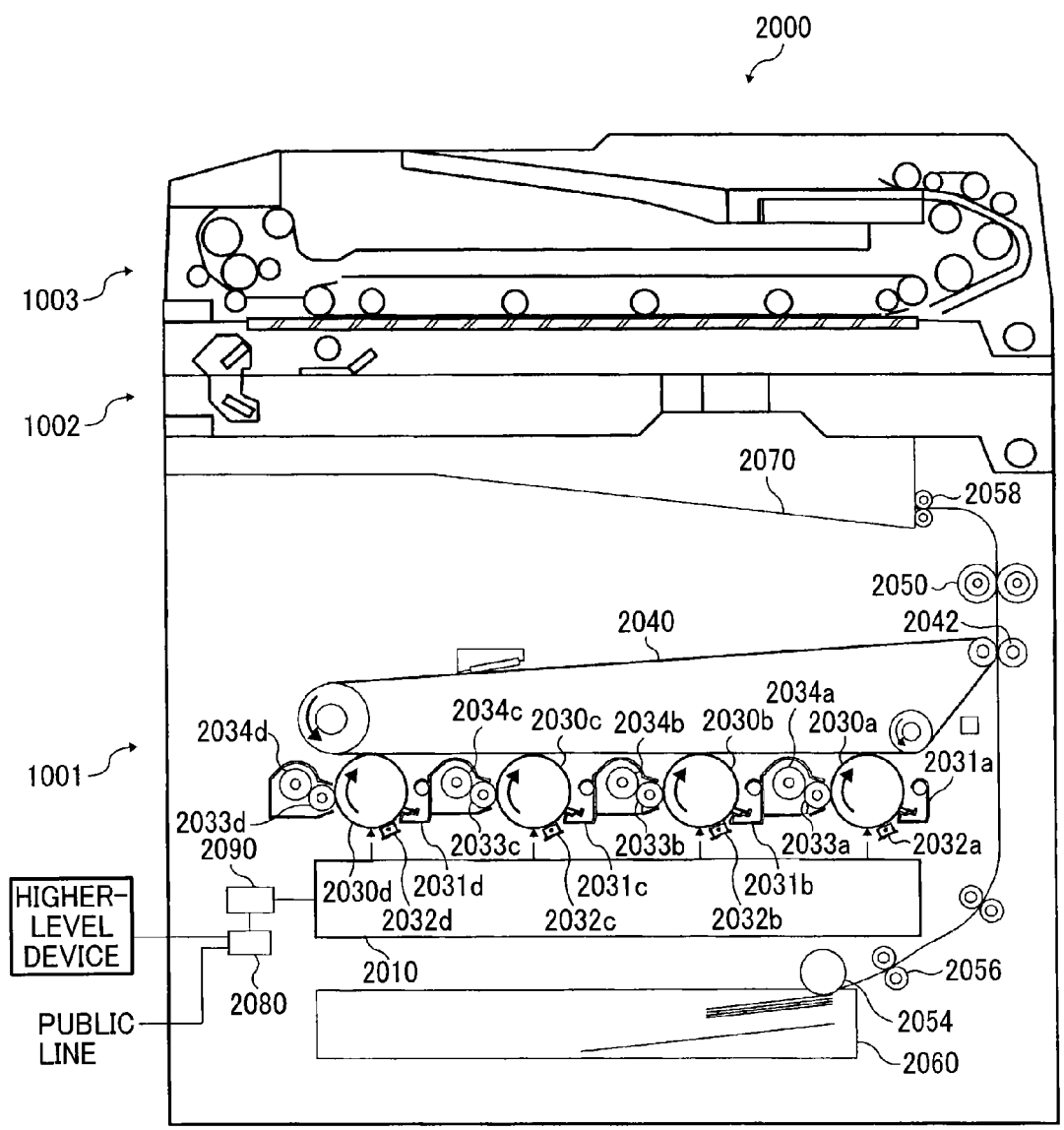
FIG. 1 illustrates a general structure of a multi-function apparatus according to an embodiment of the present invention.
Figure 2:
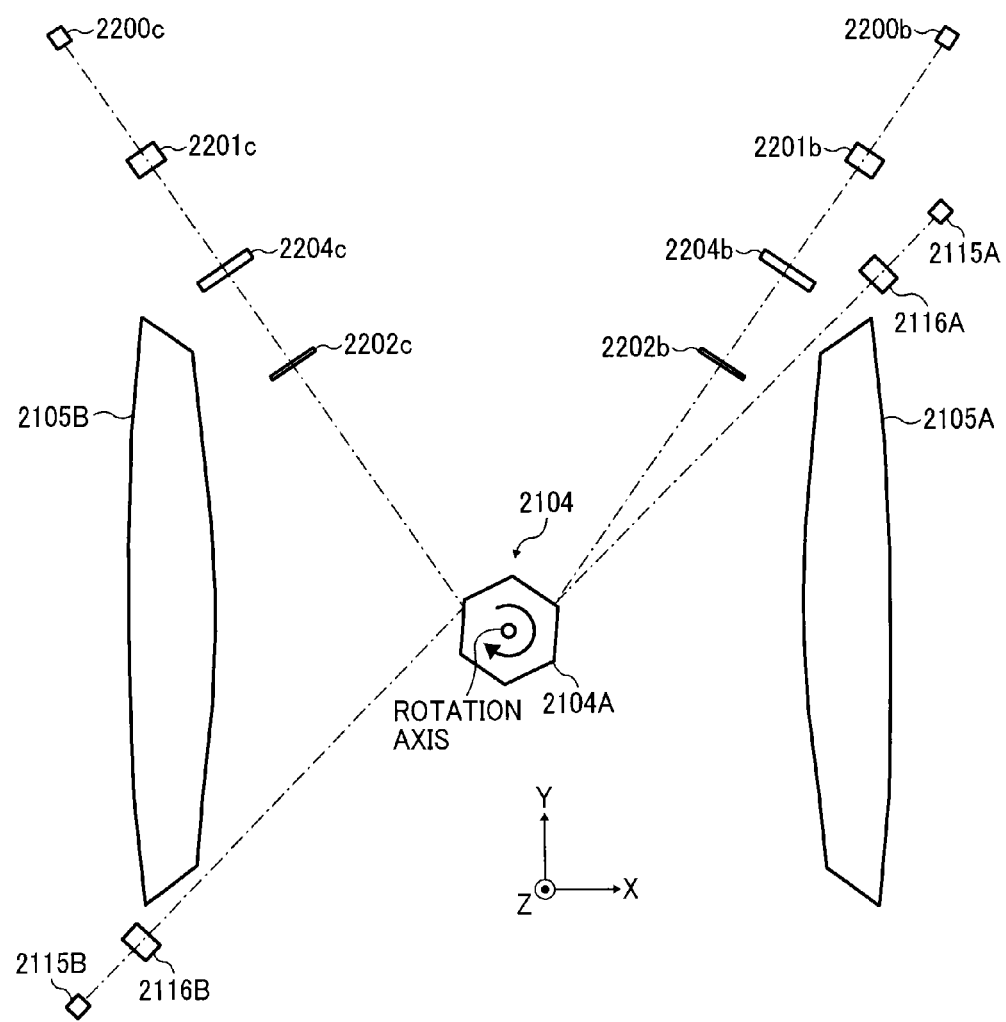
FIG. 2 schematically illustrates one structure of an optical scanning device in FIG. 1.
Figure 5:
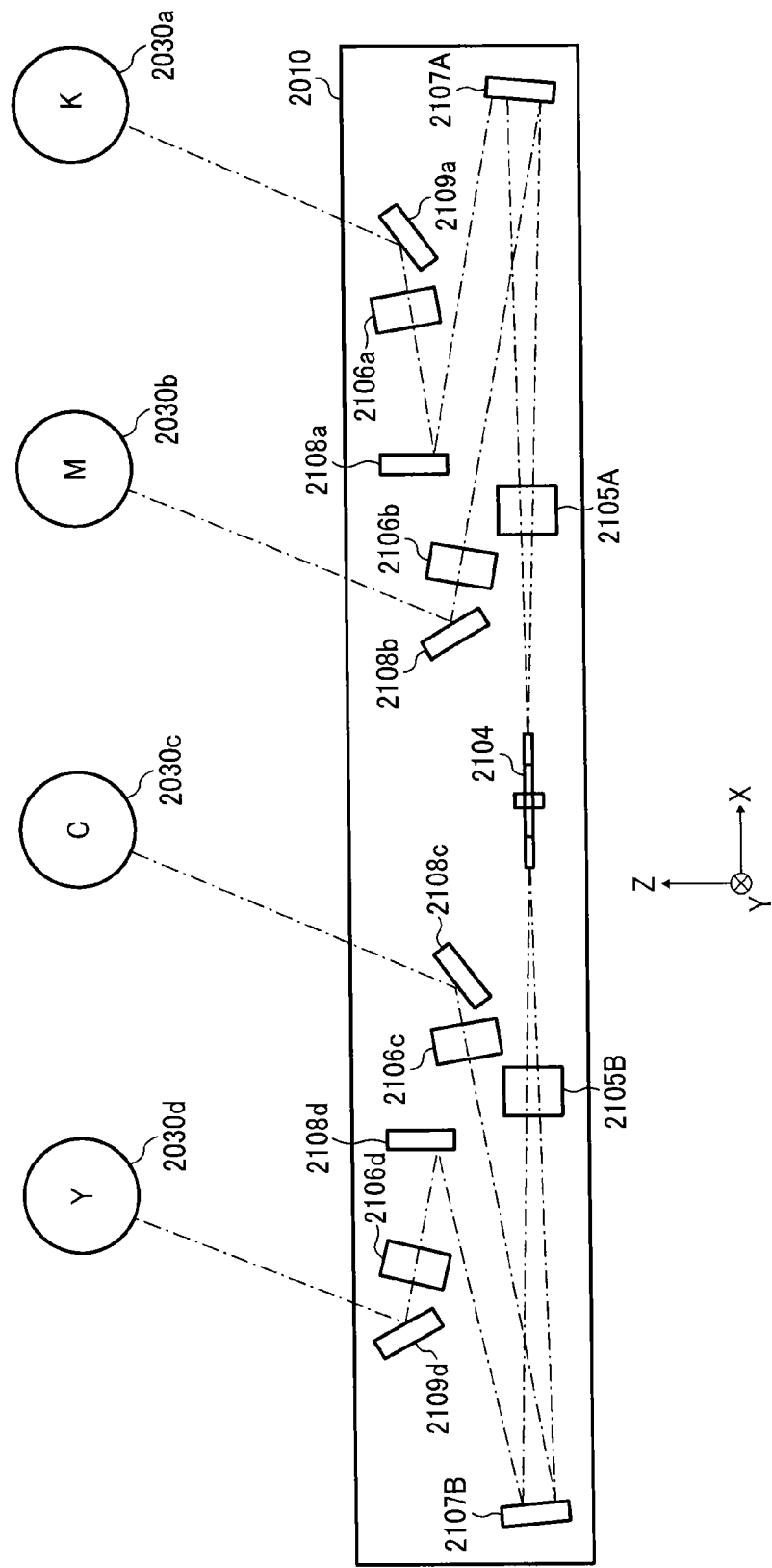
FIG. 5 schematically illustrates yet another structure of an optical scanning device in FIG. 1.

FIG. 1 illustrates a general structure of a multifunction apparatus 2000 according to an embodiment of the present invention. The multifunction apparatus 2000 functions as a copier, printer, and facsimile machine, and includes an apparatus body 1001, a scanner 1002, and an automatic document feeder (ADF) 1003.

The apparatus body 1001 serves as a tandem-type multicolor printer, in which fours colors including black, cyan, magenta, and yellow are superimposed to form a full color image. The apparatus body 1001 further includes an optical scanning device 2010, four photoreceptor drums (2030a, 2030b, 2030c, and 2030d), four cleaning units (2031a, 2031b, 2031c, and 2031d), four chargers (2032a, 2032b, 2032c, and 2032d), four developing rollers (2033a, 2033b, 2033c, and 2033d), agitation screws (2034a, 2034b, 2034c, and 2034d), an intermediate transfer belt 2040, a transfer roller 2042, a fixing roller 2050, a sheet feed roller 2054, a conveyance roller pair 2056, a sheet discharge roller pair 2058, a sheet feed tray 2060, a sheet discharge tray 2070, a communication controller 2080, and a printer controller 2090 to totally control each parts and components as described above.

The scanner 1002 is disposed at an upper side of the apparatus body 1001 and reads a document. Image data of the document read by the scanner 1002 is sent to the printer controller 2090 of the apparatus body 1001.

The automatic document feeder 1003 is disposed at an upper side of the scanner 1002 and feeds the set document toward the scanner 1002.

The communication controller 2080 controls bidirectional communication with an upper-level (upstream) device (for example, a PC) via a network and bidirectional communication with other devices via the public line.

The printer controller 2090 includes a central processing unit (CPU), a read-only memory (ROM) that stores programs described by CPU-decipherable code and various data for use in executing programs described by the CPU-decipherable code, a random-access memory (RAM), and an analog-to-digital (AD) conversion circuit. Further, the printer controller 2090 transfers image data from the scanner 1002 or, via the communication controller 2080, image data to the optical scanning device 2010.

The photoreceptor drum 2030a, the charger 2032a, the developing roller 2033a, and the cleaning unit 2031a are used as a set and constitute an image forming station to form an image of the color black, referred to as K station for the sake of simplicity.

The photoreceptor drum 2030b, the charger 2032b, the developing roller 2033b, and the cleaning unit 2031b are used as a set and constitute an image forming station to form a magenta image, that is, M station.

The photoreceptor drum 2030c, the charger 2032c, the developing roller 2033c, and the cleaning unit 2031c are used as a set and constitute an image forming station to form a cyan image, that is, C station.

The photoreceptor drum 2030d, the charger 2032d, the developing roller 2033d, and the cleaning unit 2031d are used as a set and forms an image forming station to form a yellow image, that is, Y station.

Each surface of the photoreceptor drum includes a photosensitive layer. As illustrated in FIG. 1, each photoreceptor drum is configured to rotate clockwise as shown by each arrow in the figure.

Each charger charges a surface of the corresponding photoreceptor drum evenly.

The optical scanning device 2010 scans each charged surface of the photoreceptor drum with light modulated for each color based on multicolor image data including black image data, cyan image data, magenta image data, and yellow image data received from the printer controller 2090, to form a latent image corresponding to the image data on the surface of the photoreceptor drum. Specifically, the surface of each photoreceptor drum is a scanned surface here and each photoreceptor drum serves as an image carrier. The thus-formed latent image moves toward a corresponding developing device following the rotation of the photoreceptor drum. The optical scanning device 2010 will be described in detail below.

It is noted that the optically scanned area of each photoreceptor drum is called a "scan area." The area among the scan area on which image data is written is called an "effective scan area" "image forming area" or "effective image area." In addition, a direction parallel to a rotation axis of each photoreceptor drum is referred to as a "main scanning direction" and the rotation direction of the photoreceptor drum is referred to as a "sub-scanning direction."

Each surface of the developing roller while rotating is evenly and thinly coated with toner from a corresponding toner cartridge. Then, when the toner applied to the surface of each developing roller contacts the surface of the corresponding photoreceptor drum, the toner moves to a part of the surface of the photoreceptor drum where the light has been emitted and adheres thereto. Specifically, the developing roller allows the toner to be adhered onto the latent image formed on the corresponding surface of the photoreceptor drum, thereby rendering the latent image visible. The thus-formed toner image carrying the toner moves toward the intermediate transfer belt 2040 following the rotation of the photoreceptor drum. Thereafter, each toner image of yellow, magenta, cyan, or black is sequentially transferred on the intermediate transfer belt 2040 at a predetermined timing, thereby forming a superimposed color image.

The sheet feed tray 2060 contains, in general, a plurality of recording sheets. The sheet feed roller 2054 disposed in the vicinity of the sheet feed tray 2060 is used to extract the recording sheets from the sheet feed tray 2060 one by one. Then, the recording sheet is conveyed between the intermediate transfer belt 2040 and the transfer roller 2042 at a predetermined timing. Accordingly, the color image on the intermediate transfer belt 2040 is transferred to the recording sheet. The recording sheet on which the color image is transferred is conveyed to the fixing roller 2050.

The fixing roller 2050 is configured to apply heat and pressure to the recording sheet, so that the toner is fused and fixed onto the recording sheet. The recording sheet on which the toner is fixed is then conveyed to the sheet discharge tray 2070 via the sheet discharge roller 2058, so as to be sequentially piled on the sheet discharge tray 2070.

Thereafter, each cleaning unit removes residual toner remaining on the surface of the corresponding photoreceptor drum. The surface of the photoreceptor drum from which the residual toner is removed returns to a position opposite the corresponding charger again.

Next, a description will be given of the construction of the optical scanning device 2010.

As illustrated in FIGS. 2 to 5, the optical scanning device 2010 includes four light sources (2200a, 2200b, 2200c, and 2200d), four coupling lenses (2201a, 2201b, 2201c, and 2201d), four aperture plates (2202a, 2202b, 2202c, and 2202d), four cylindrical lenses (2204a, 2204b, 2204c, and 2204d), a light deflector 2104, two first scanning lenses (2015A and 2015B), four second scanning lenses (2106a, 2106b, 2106c, and 2106d), eight folding mirrors (2107A, 2107B, 2108a, 2108b, 2108c, 2108d, 2109a, and 2109d), two synchronization detection sensors (2115A and 2115B), two synchronization optical system (2116A and 2116B), and a scanning controller. Then, these are mounted to a housing of the optical system at predetermined positions.

In the following description, in the X-Y-Z three-dimensional orthogonal coordinate, a direction along the longitudinal direction of each photoreceptor drum, i.e., the rotation axis, is defined as Y-axis, and the direction along the rotation axis of the light deflector 2104 is defined as Z-axis. Further, for simplicity, description will be given of a case in which the main scanning direction is set to a "main scanning homologous direction" and the sub-scanning direction is set to a "sub-scanning homologous direction."

The light sources 2200a and 2200b are disposed apart from each other in the Z-axis. The light sources 2200c and 2200d are disposed apart from each other in the Z-axis. The two light sources 2200a and 2200b and the other two light sources 2200c and 2200d are disposed apart in the X-axis.

Herein, light fluxes emitted from the light source 2200a are referred to as "light flux La" and those emitted from the light source 2200b are referred to as "light flux Lb." Further, those emitted from the light source 2200c are referred to as "light flux Lc" and light fluxes emitted from the light source 2200d are referred to as "light flux Ld".

The coupling lens 2201a disposed on an optical path of the light flux La emitted from the light source 2200a makes the light flux La into a substantially parallel light flux. The coupling lens 2201b disposed on an optical path of the light flux Lb emitted from the light source 2200b makes the light flux La into a substantially parallel light flux. The coupling lens 2201c disposed on an optical path of the light flux Lc emitted from the light source 2200c makes the light flux Lc into a substantially parallel light flux. The coupling lens 2201d disposed on an optical path of the light flux Ld emitted from the light source 2200d makes the light flux Ld into a substantially parallel light flux.

The cylindrical lens 2204a disposed on an optical path of the light flux La via the coupling lens 2201a focuses the light flux La to the Z-axis. The cylindrical lens 2204b disposed on an optical path of the light flux Lb via the coupling lens 2201b focuses the light flux Lb to the Z-axis. The cylindrical lens 2204c disposed on an optical path of the light flux Lc via the coupling lens 2201c focuses the light flux Lc to the Z-axis. The cylindrical lens 2204d disposed on an optical path of the light flux Ld via the coupling lens 2201d focuses the light flux Ld to the Z-axis.

The aperture plate 2202a includes an aperture and shapes the light flux La via the cylindrical lens 2204a. The aperture plate 2202b includes an aperture and shapes the light flux Lb via the cylindrical lens 2204b. The aperture plate 2202c includes an aperture and shapes the light flux Lc via the cylindrical lens 2204c. The aperture plate 2202d includes an aperture and shapes the light flux Ld via the cylindrical lens 2204d.

The light flux that passes through the aperture of each aperture plate is incident to the light deflector 2104. The light deflector 2104 includes a rotating polygon mirror 2104A. Herein, the rotating polygon mirror includes six mirror surfaces and each mirror surface serves as a deflection surface. The rotating polygon mirror rotates in a clockwise direction as indicated by an arrow in FIG. 2.

The light flux that enters the light deflector 2104 obliquely to the X-Y surface perpendicular to the rotation axis of the rotating polygon mirror 2104A is called "oblique incidence" and an angle of the oblique incidence is called "oblique incidence angle." In contrast, the light flux that enters the light deflector 2104 from a horizontal direction to the surface perpendicular to the rotation axis is called "horizontal incidence." In addition, the optical system to cope with the oblique incidence is called an "oblique incidence optical system" and that to cope with the horizontal incidence is called a "horizontal incidence optical system."

In the present embodiment, as illustrated in FIG. 3, the light flux La obliquely enters the light deflector 2104 at an angle −δ and the light flux Lb obliquely enters the light deflector 2104 at an angle +δ. Further, as illustrated in FIG. 4, the light flux Lc obliquely enters the light deflector 2104 at an angle +δ and the light flux Ld obliquely enters the light deflector 2104 at an angle −δ. Herein, the angle δ is set to 2.3°. Note that the angle δ is not limited to 2.3° and can be set to any value within a range from 2° to 5°.

The optical system disposed on the optical path between each light source and the light deflector 2104 is called an "optical system before deflector." Herein, the optical system before the deflector is the oblique incidence optical system.

Then, the system is configured such that the light flux La and the light flux Lb are deflected by the same deflection surface and the light flux Lc and the light flux Ld are deflected by the same deflection surface. Further, the system is configured such that the light flux La and the light flux Lb are crossed on the same deflection surface and the light flux Lc and the light flux Ld are crossed on the same deflection surface. Compared to the horizontal incidence arrangement, the oblique incidence optical system enables use of a smaller rotating polygon mirror relative to the Z-axis, so that production costs are drastically reduced and rotational speed can be increased.

Herein, the light flux La and the light flux Lb are deflected to +X side of the light deflector 2104 and the light flux Lc and the light flux Ld can be deflected to −X side of the light deflector 2104.

The light flux La deflected by the light deflector 2104 passes through the first scanning lens 2105A, the folding mirror 2107A, the folding mirror 2108a, the second scanning lens 2106a, and the folding mirror 2109a, to irradiate the photoreceptor drum 2030a.

The light flux Lb deflected by the light deflector 2104 passes through the first scanning lens 2105A, the folding mirror 2107A, the second scanning lens 2106b, and the folding mirror 2108b, to irradiate the photoreceptor drum 2030b.

The first scanning lens 2105A and the folding mirror 2107A are shared by the light flux La and the light flux Lb.

The light flux Lc deflected by the light deflector 2104 passes through the first scanning lens 2105B, the folding mirror 2107B, the second scanning lens 2106c, and the folding mirror 2108c, to irradiate the photoreceptor drum 2030c.

The light flux Ld deflected by the light deflector 2104 passes through the first scanning lens 2105B, the folding mirror 2107B, the folding mirror 2108d, the second scanning lens 2106d, and the folding mirror 2109d, to irradiate the photoreceptor drum 2030d.

The first scanning lens 2105B and the folding mirror 2107B are shared by the light flux Lc and the light flux Ld. Herein, because the absolute value of the oblique incidence angle of four light fluxes incident to the deflection surface is the same, each light flux can employ a similarly-configured second scanning lens. Thus, further reduction of costs is possible.

Figure 6:
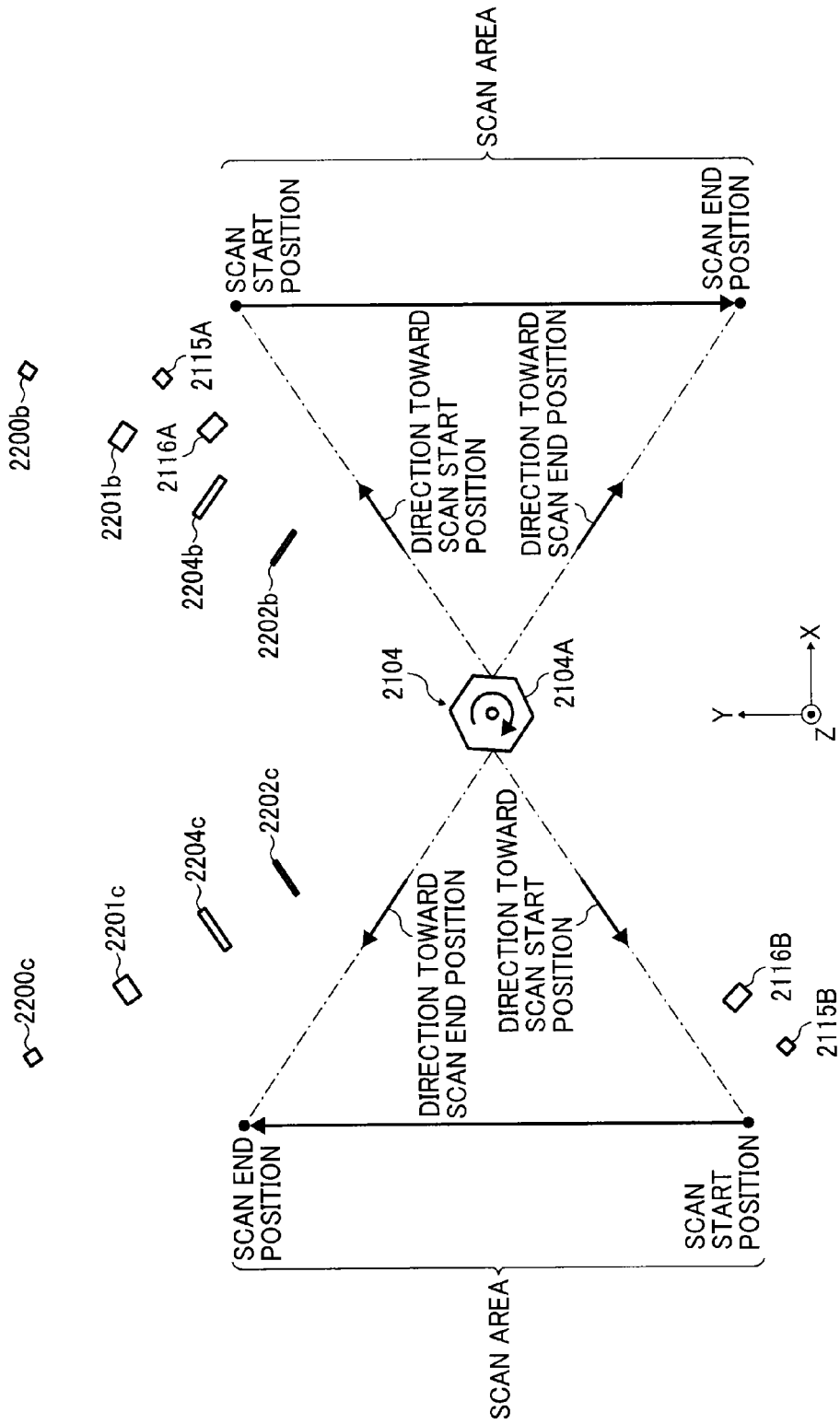
FIG. 6 illustrates a scan start position and a scan end position in a scan area of the optical scanning device.

The light spot on each photoreceptor drum moves along the main scanning direction following a rotation of the rotating polygon mirror. As illustrated in FIG. 6, optical scanning is performed toward −Y direction for the photoreceptor drums 2030a and 2030b, and the optical scanning is performed toward +Y direction for the photoreceptor drums 2030c and 2030d.

Then, when the light is orthogonally projected onto a plane perpendicular to the rotation axis of the rotating polygon mirror 2014A, an angle formed by a forwarding direction of the light flux toward the synchronization detection sensor 2115A after being deflected by the light deflector 2104 and an incident direction of the light flux incident to the light deflector 2104 is smaller than that formed between a forwarding direction of the light flux directed onto the scan area after being deflected by the light deflector 2104 and an incident direction of the light flux incident to the light deflector 2104.

In contrast, when the light is orthogonally projected onto a plane perpendicular to the rotation axis of the rotating polygon mirror, an angle formed by a forwarding direction of the light flux toward the synchronization detection sensor 2115B after being deflected by the light deflector 2104 and an incident direction of the light flux incident to the light deflector 2104 is larger than that formed between a forwarding direction of the light flux directed onto the scan area after being deflected by the light deflector 2104 and an incident direction of the light flux incident to the light deflector 2104.

The optical system disposed on the optical path between the light deflector 2104 and each photoreceptor drum is also called a "scanning optical system." The synchronization detection sensor 2115A is disposed at a position to which the light flux La deflected by the light deflector 2104, before writing to the photoreceptor drum 2030a, is incident. The light flux that is incident to the synchronization detection sensor 2115A can be referred to as a "synchronization light flux La."

The synchronization optical system 2116A disposed on the light path of the synchronization light flux La between the light deflector 2104 and the synchronization detection sensor 2115A, focuses the synchronization light flux La. The synchronization optical system 2116A can be formed by a single lens alone or by multiple lenses.

The synchronization detection sensor 2115B is disposed at a position to which the light flux Ld deflected by the light deflector 2104, before writing to the photoreceptor drum 2030d, is incident. The light flux that is incident to the synchronization detection sensor 2115B can be referred to as a "synchronization light flux Ld."

The synchronization optical system 2116B disposed on the light path of the synchronization light flux Ld between the light deflector 2104 and the synchronization detection sensor 2115B, focuses the synchronization light flux Ld. The synchronization optical system 2116B can be formed by a single lens alone or by multiple lenses.

Each synchronization detection sensor includes a light receiver, and outputs signals according to a received light amount to the scanning controller. The scanning controller obtains a timing to start writing to the photoreceptor drums 2030a and 2030b based on the output signals from the synchronization detection sensor 2115A, and obtains a timing to start writing to the photoreceptor drums 2030c and 2030d based on the output signals from the synchronization detection sensor 2115B.

Herein, an axis parallel to the direction perpendicular to the main scanning direction that passed through a rotation center of the rotating polygon mirror is referred to as a "reference axis." Herein, the reference axis is consistent with the X-axis.

Then, when the light is orthogonally projected onto a plane perpendicular to the rotation axis of the rotating polygon mirror, an angle formed by an incident direction of the light flux La incident to the light deflector 2104 and the reference axis is the same as an angle formed between an incident direction of the light flux Lb incident to the light deflector 2104 and the reference axis.

In addition, when the light is orthogonally projected onto a plane perpendicular to the rotation axis of the rotating polygon mirror, an angle formed by an incident direction of the light flux Lc incident to the light deflector 2104 and the reference axis is the same as an angle formed between an incident direction of the light flux Ld incident to the light deflector 2104 and the reference axis.

Figure 7:
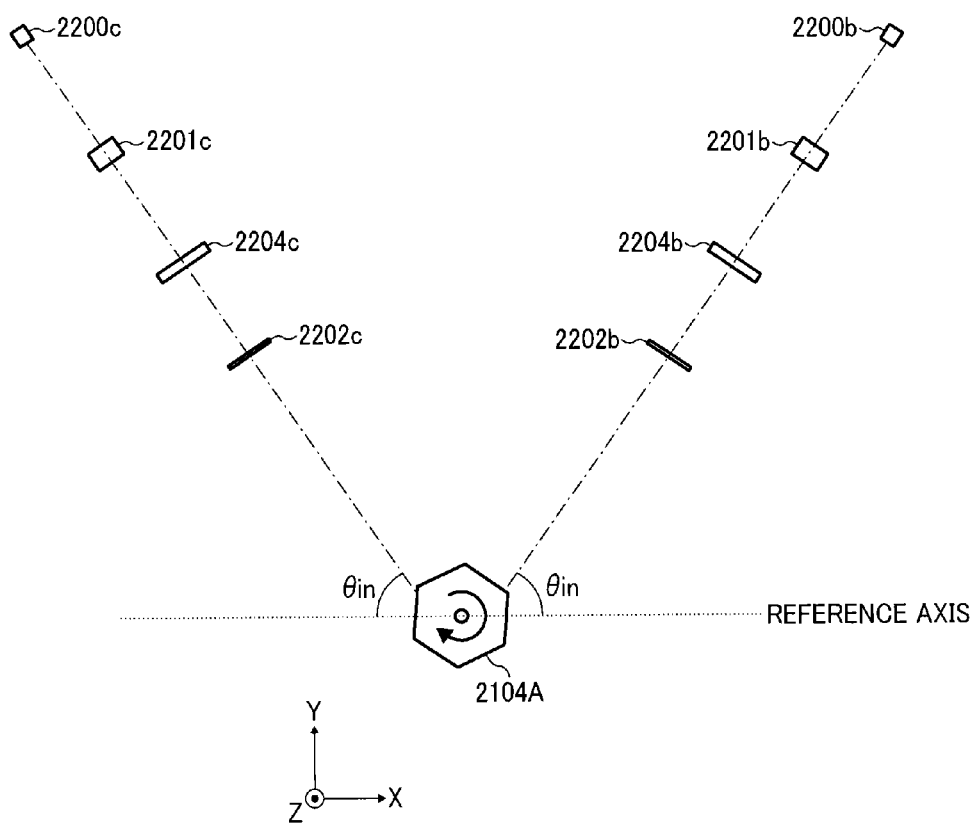
FIG. 7 illustrates an angle θin formed between an incident or forwarding direction of light flux incident to a light deflector and a reference axis.

Further, an absolute value of the angle formed between the incident direction of the light flux La and the light flux Lb incident to the light deflector 2104 and the reference axis and an absolute value of the angle formed between the incident direction of the light flux Lc and the light flux Ld incident to the light deflector 2104 and the reference axis are set to be the same. As illustrated in FIG. 7, when the light is orthogonally projected onto a plane perpendicular to the rotation axis of the rotating polygon mirror, an angle formed by an incident direction of the light flux emitted from each light source and incident to the light deflector 2104, and the reference axis, is denoted θin.

In addition, as illustrated in FIG. 8, when the light is orthogonally projected onto a plane perpendicular to the rotation axis of the rotating polygon mirror, a width of the light flux passing through the aperture of each aperture plate and incident to the light deflector 2104 is denoted din. In the present embodiment, the width din is set to 3.8 mm.

Figure 9:
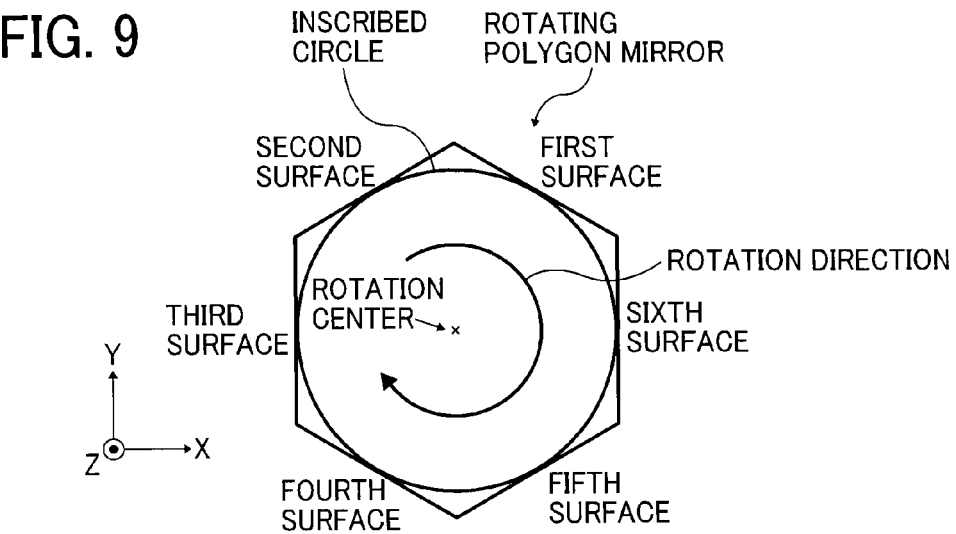
FIG. 9 illustrates an inscribed circle of a rotating polygon mirror.

A diameter of a circle inscribed in the rotating polygon mirror is 18 mm (see FIG. 9). A width of a deflection surface, as a length relative to the main scanning homologous direction is approximately 10.4 mm. Specifically, din is smaller than the width of a deflection surface or the length relative to the main scanning homologous direction.

Concerning the rotating polygon mirror, when each of six deflection surfaces needs to be identified individually, the six deflection surfaces are to be denoted as first surface, second surface, . . . , and sixth surface (see FIG. 9) in reverse order to the rotation direction of the rotating polygon mirror.

Next, light flux emitted from the light source 2200d and incident to the light deflector 2104, and light flux deflected by the light deflector 2104, will be described with reference to FIGS. 10 to 13. Herein, the light flux reflected by the first surface of the rotating polygon mirror is directed onto the synchronization detection sensor 2115B and a scan area of the photoreceptor drum 2030d.

Figure 10:
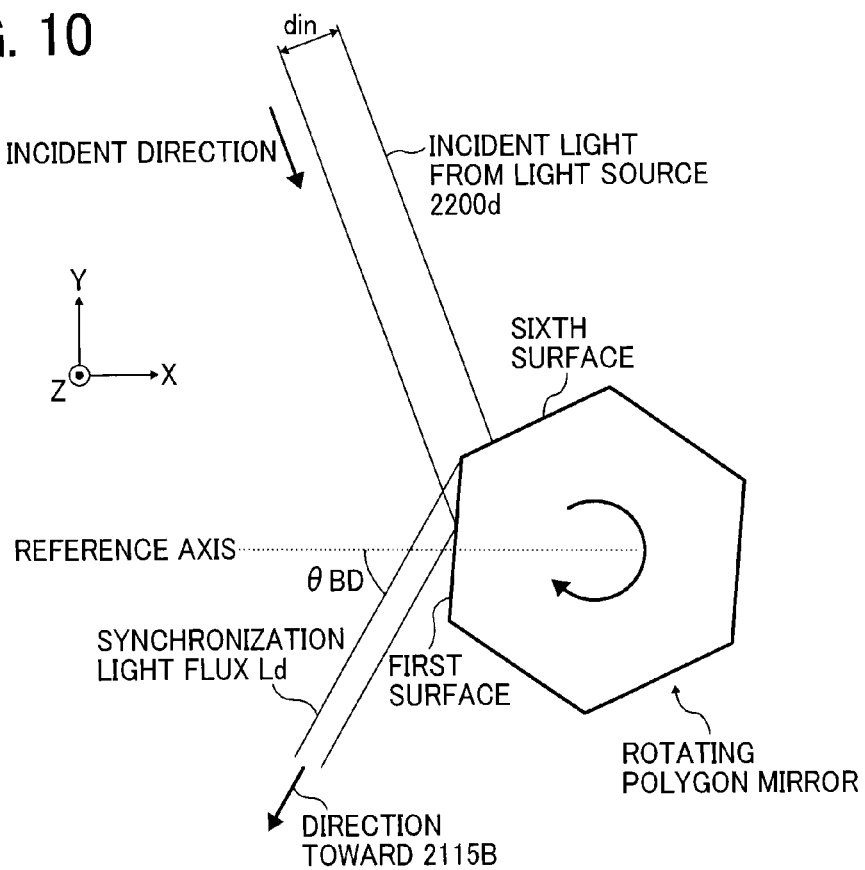
FIG. 10 illustrates incident light flux and synchronization light flux Ld relative to the rotating polygon mirror when light flux emitted from a light source deflected by the light deflector is directed onto a synchronization detection sensor.

FIG. 10 illustrates incident light flux and synchronization light flux Ld relative to the rotating polygon mirror when light flux deflected by the light deflector 2104 is directed onto the synchronization detection sensor 2115B. At this time, all the light flux incident to the light deflector 2104 does not enter into the first surface of the rotating polygon mirror, but a part of the light flux incident to the light deflector 2104 is configured to be incident to the sixth surface. Note that the light flux reflected by the first surface becomes the synchronization light flux Ld.

Specifically, the light deflector 2104 cancels a part of the incident light flux. As illustrated in FIG. 10, an angle formed by a forwarding direction of the light flux reflected by the first surface of the rotating polygon mirror and the reference axis is denoted as θBD.

Figure 11:
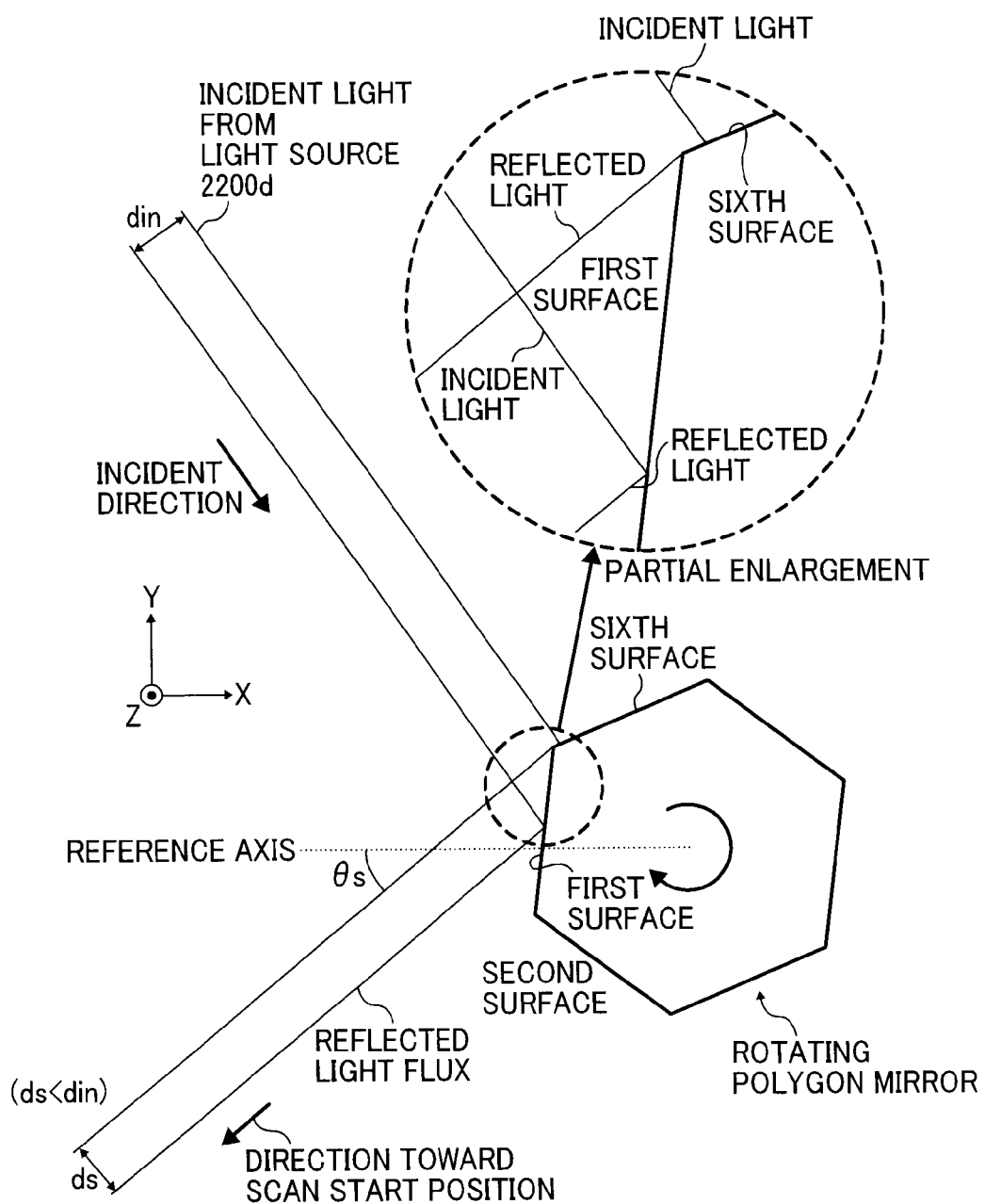
FIG. 11 illustrates incident light flux and reflected light flux relative to the rotating polygon mirror when light flux emitted from the light source and deflected by the light deflector is directed onto the scan start position in the scan area of the photoreceptor drum.

FIG. 11 illustrates incident light flux and reflected light flux relative to the rotating polygon mirror when light flux deflected by the light deflector 2104 is directed onto a scan start position in a scan area of the photoreceptor drum 2030d. At this time, all the light flux incident to the light deflector 2104 does not enter into the first surface of the rotating polygon mirror, but a part of the light flux incident to the light deflector 2104 is configured to be incident to the sixth surface.

Specifically, the light deflector 2104 cancels a part of the incident light flux. An angle formed by a forwarding direction of the light flux reflected by the first surface of the rotating polygon mirror and the reference axis is denoted as θs.

As a result, a width ds of the light flux reflected by the first surface of the rotating polygon mirror and directed onto the scan start position of the photoreceptor drum 2030d is smaller than a width din of the light flux incident to the light deflector 2104.

Figure 12:
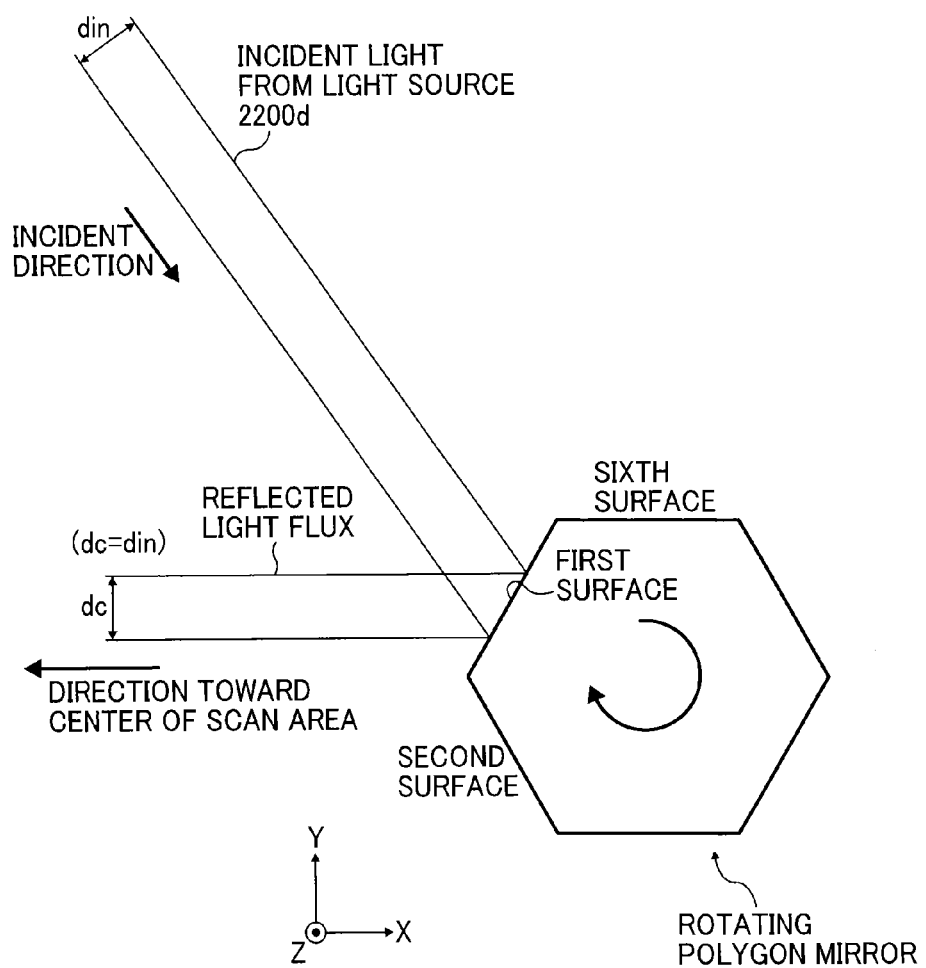
FIG. 12 illustrates incident light flux and reflected light flux relative to the rotating polygon mirror when light flux emitted from the light source and deflected by the light deflector is directed onto a center position of the scan area of the photoreceptor drum.

FIG. 12 illustrates incident light flux and reflected light flux relative to the rotating polygon mirror when light flux deflected by the light deflector 2104 is directed onto a center position of the scan area of the photoreceptor drum 2030d. At this time, all the light flux incident to the light deflector 2104 is configured to be incident to the first surface of the rotating polygon mirror.

Specifically, the light deflector 2104 does not cancel any of the incident light flux. As a result, a width dc of the light flux reflected by the first surface of the rotating polygon mirror and directed onto the center position of the scan area of the photoreceptor drum 2030d is the same as the width din of the light flux incident to the light deflector 2104.

Figure 13:
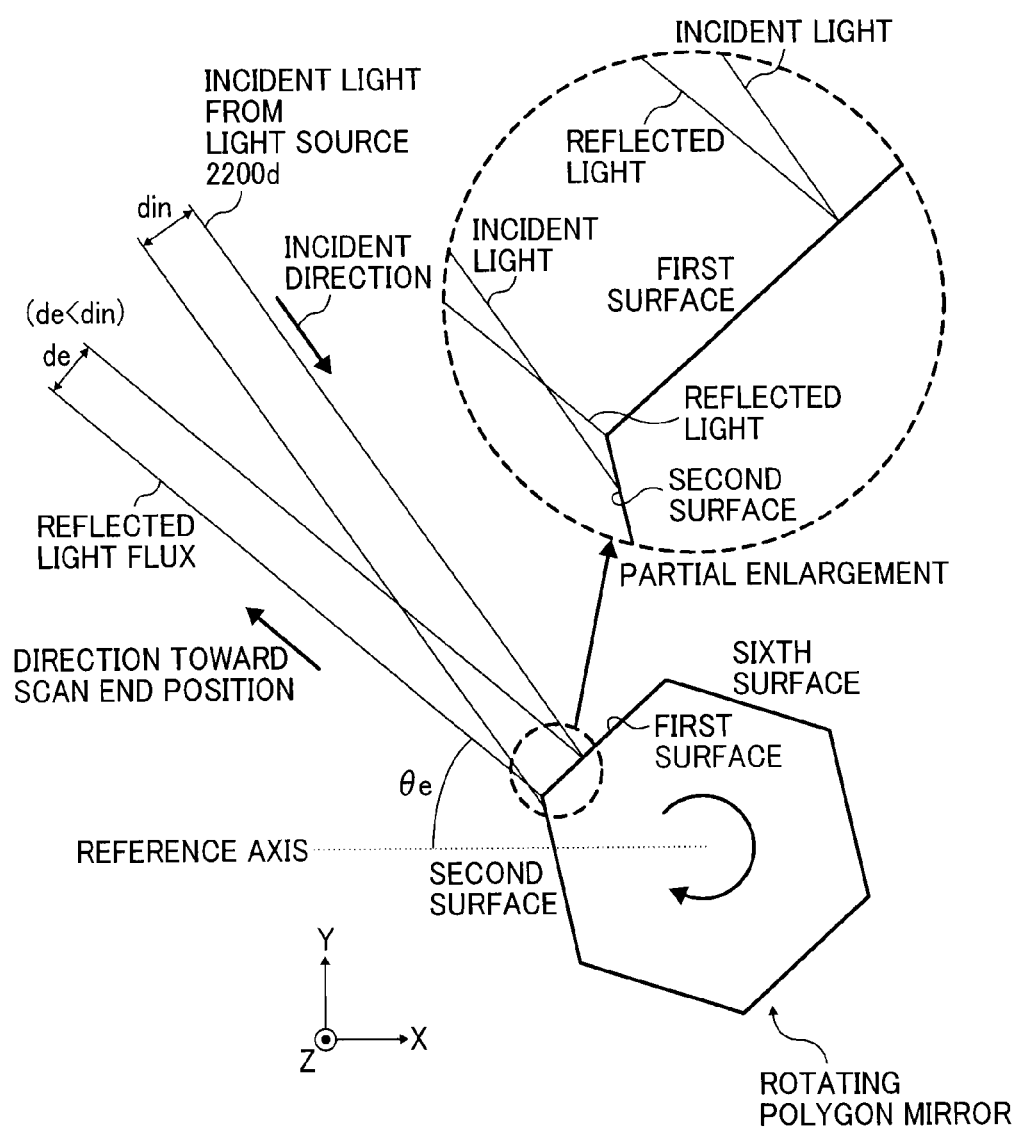
FIG. 13 illustrates incident light flux and reflected light flux relative to the rotating polygon mirror when light flux emitted from the light source and deflected by the light deflector is directed onto the scan an end position in the scan area of the photoreceptor drum.

FIG. 13 illustrates incident light flux and reflected light flux relative to the rotating polygon mirror when light flux deflected by the light deflector 2104 is directed onto a scan end position in the scan area of the photoreceptor drum 2030d. At this time, not all the light flux incident to the light deflector 2104 enters into the first surface of the rotating polygon mirror; instead, a part of the light flux incident to the light deflector 2104 is configured to be incident to the second surface.

Specifically, the light deflector 2104 cancels a part of the incident light flux. As illustrated in FIG. 13, an angle formed by a forwarding direction of the light flux reflected by the first surface of the rotating polygon mirror and the reference axis is denoted as θe.

As a result, a width de of the light flux reflected by the first surface of the rotating polygon mirror and directed onto the scan end position of the photoreceptor drum 2030d is smaller than the width din of the light flux incident to the light deflector 2104.

Figure 14:
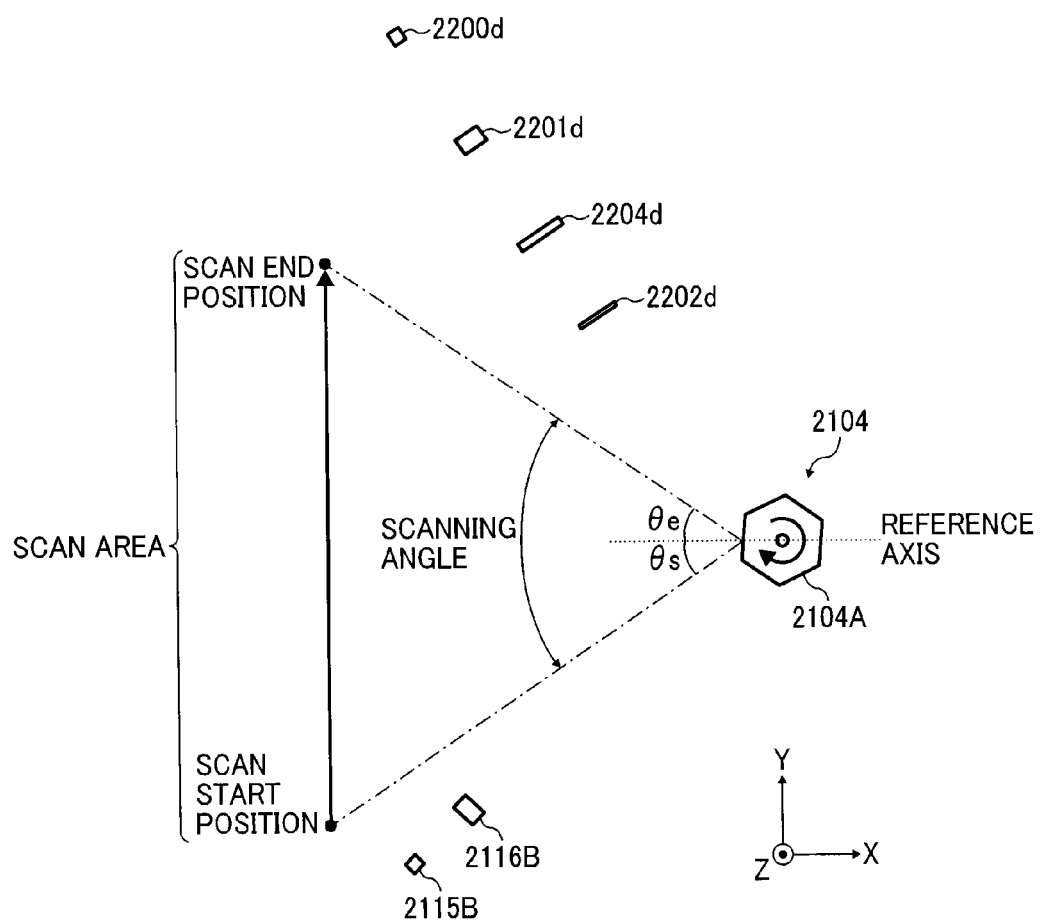
FIG. 14 is a view illustrating scanning angle.

As illustrated in FIG. 14, an angle |θs|+|θe| corresponds to a scanning angle. Herein, because |θs| equals to |θe|, each of |θs| and |θe| is called a "half scanning angle."

More specifically, the scan start position in the scan area of the photoreceptor drum 2030d resides at −Y side end position of the scan area relative to the main scanning direction and the scan end position in the scan area of the photoreceptor drum 2030d resides at +Y side end position of the scan area relative to the main scanning direction.

Note that the light flux emitted from the light source 2200c and directed onto the scan area of the photoreceptor drum 2030c performs similarly to the light flux emitted from the light source 2200d and directed onto the scan area of the photoreceptor drum 2030d.

Next, light flux emitted from the light source 2200a and incident to the light deflector 2104 and light flux deflected by the light deflector 2104 will be described with reference to FIGS. 15 to 18. Herein, the light flux reflected by the first surface of the rotating polygon mirror is directed onto the synchronization detection sensor 2115A and the scan area of the photoreceptor drum 2030a.

Figure 15:
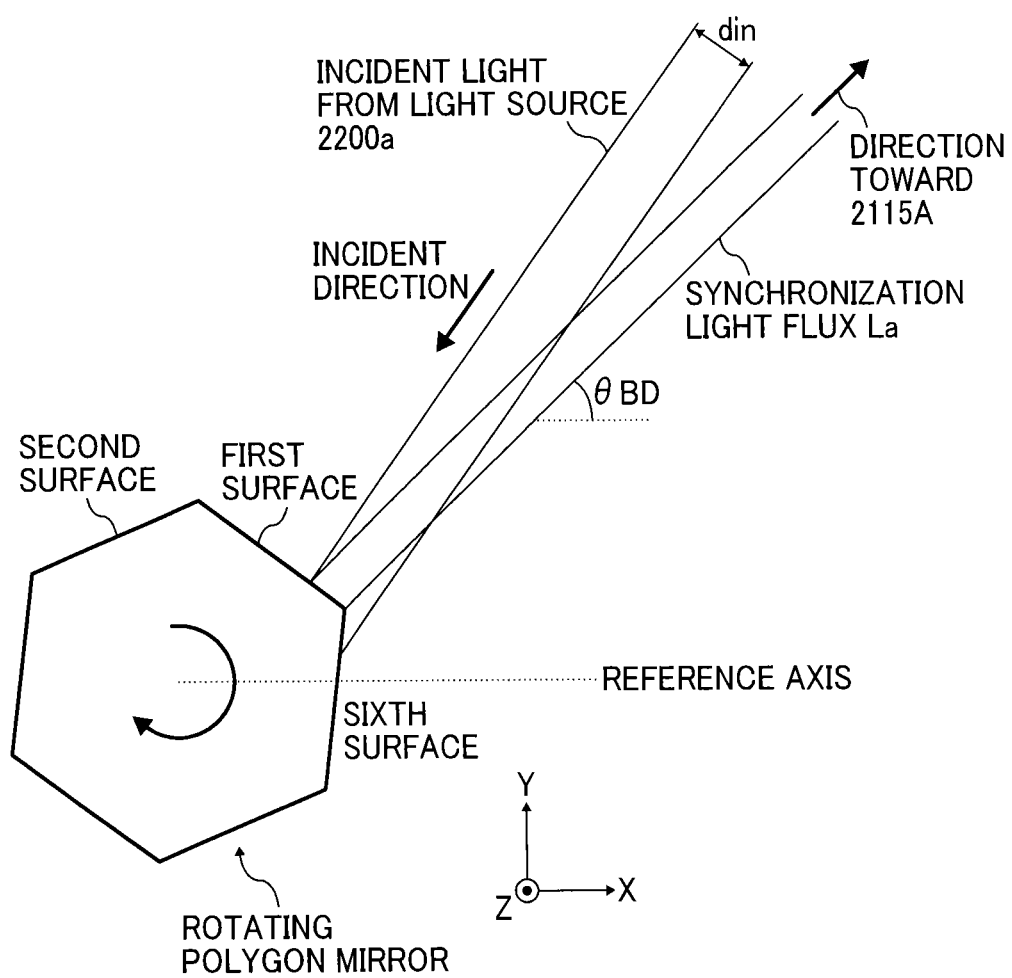
FIG. 15 illustrates incident light flux and synchronization light flux La relative to the rotating polygon mirror when light flux emitted from the light source and deflected by the light deflector is directed onto the synchronization detection sensor.

FIG. 15 illustrates incident light flux and synchronization light flux La relative to the rotating polygon mirror when light flux deflected by the light deflector 2104 is directed onto the synchronization detection sensor 2115A. At this time, all the light flux incident to the light deflector 2104 does not enter into the first surface of the rotating polygon mirror, but a part of the light flux incident to the light deflector 2104 is configured to be incident to the sixth surface. Note that the light flux reflected by the first surface becomes the synchronization light flux La.

Specifically, the light deflector 2104 cancels a part of the incident light flux. As illustrated in FIG. 15, an angle formed by a forwarding direction of the light flux reflected by the first surface of the rotating polygon mirror and the reference axis is denoted as θBD.

Figure 16:
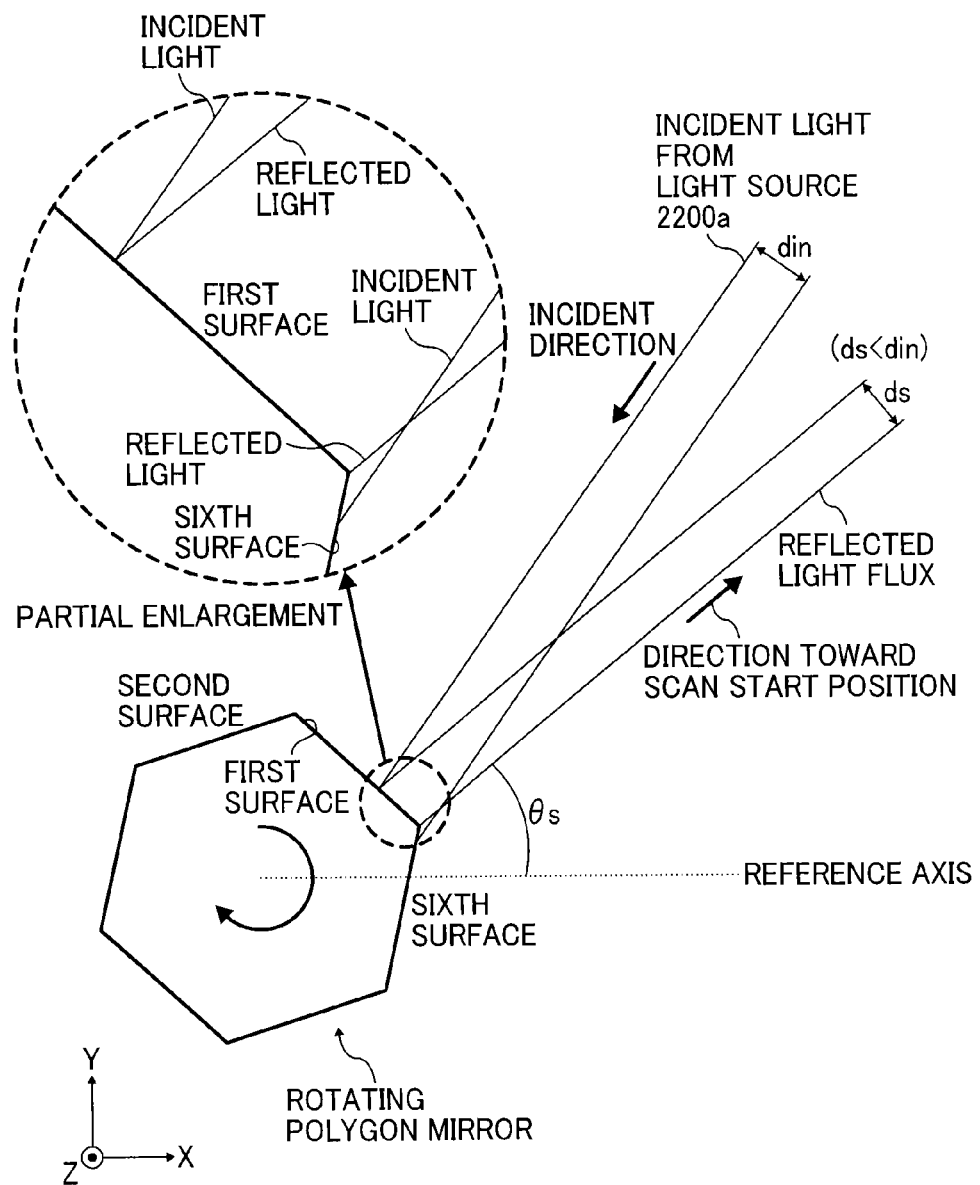
FIG. 16 illustrates incident light flux and reflected light flux relative to the rotating polygon mirror when light flux emitted from the light source and deflected by the light deflector is directed onto the scan start position in the scan area of the photoreceptor drum.

FIG. 16 illustrates incident light flux and reflected light flux relative to the rotating polygon mirror when light flux deflected by the light deflector 2104 is directed onto the scan start position in the scan area of the photoreceptor drum 2030a. At this time, all the light flux incident to the light deflector 2104 does not enter into the first surface of the rotating polygon mirror, but a part of the light flux incident to the light deflector 2104 is configured to be incident to the sixth surface.

Specifically, the light deflector 2104 cancels a part of the incident light flux. As illustrated in FIG. 16, an angle formed by a forwarding direction of the light flux reflected by the first surface of the rotating polygon mirror and the reference axis is denoted as θs.

As a result, the width ds of the light flux reflected by the first surface of the rotating polygon mirror and directed onto the scan start position of the photoreceptor drum 2030a is smaller than the width din of the light flux incident to the light deflector 2104.

Figure 17:
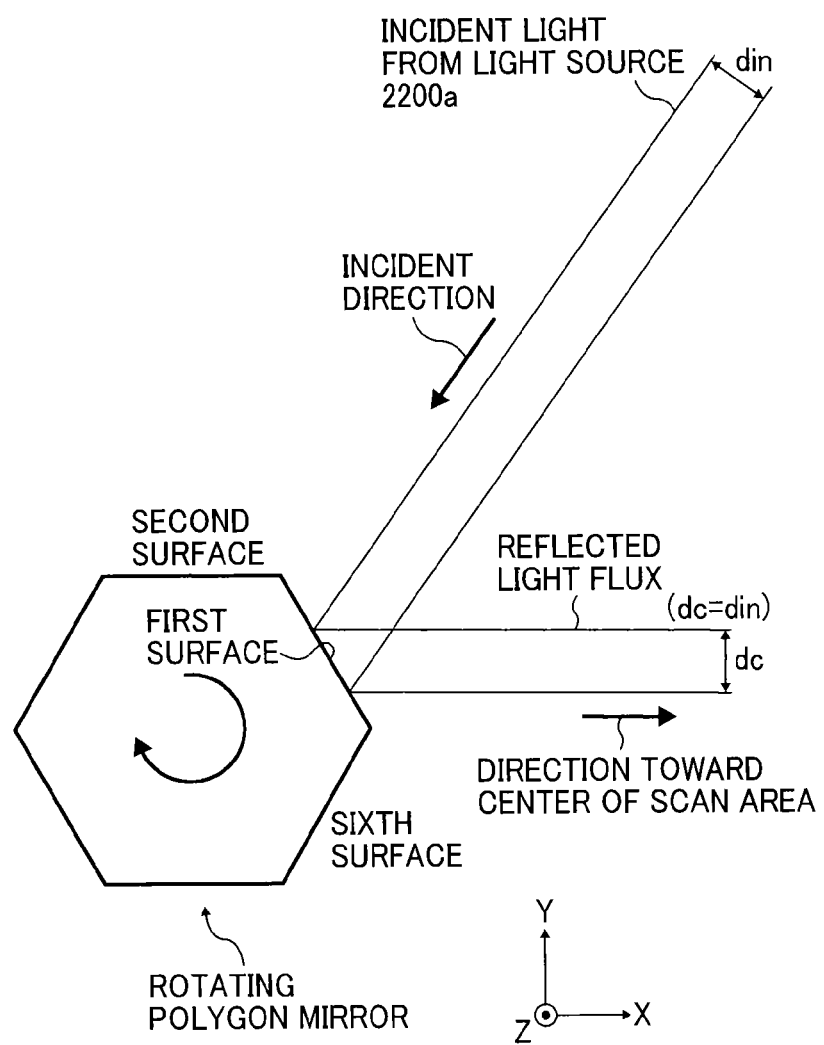
FIG. 17 illustrates incident light flux and reflected light flux relative to the rotating polygon mirror when light flux emitted from the light source and deflected by the light deflector is directed onto the center position of the scan area of the photoreceptor drum.

FIG. 17 illustrates incident light flux and reflected light flux relative to the rotating polygon mirror when light flux deflected by the light deflector 2104 is directed onto the center position of the scan area of the photoreceptor drum 2030a. At this time, all the light flux incident to the light deflector 2104 is configured to be incident to the first surface of the rotating polygon mirror.

Specifically, the light deflector 2104 does not cancel any of the incident light flux. As a result, the width dc of the light flux reflected by the first surface of the rotating polygon mirror and directed onto the center position of the scan area of the photoreceptor drum 2030a is the same as the width din of the light flux incident to the light deflector 2104.

Figure 18:
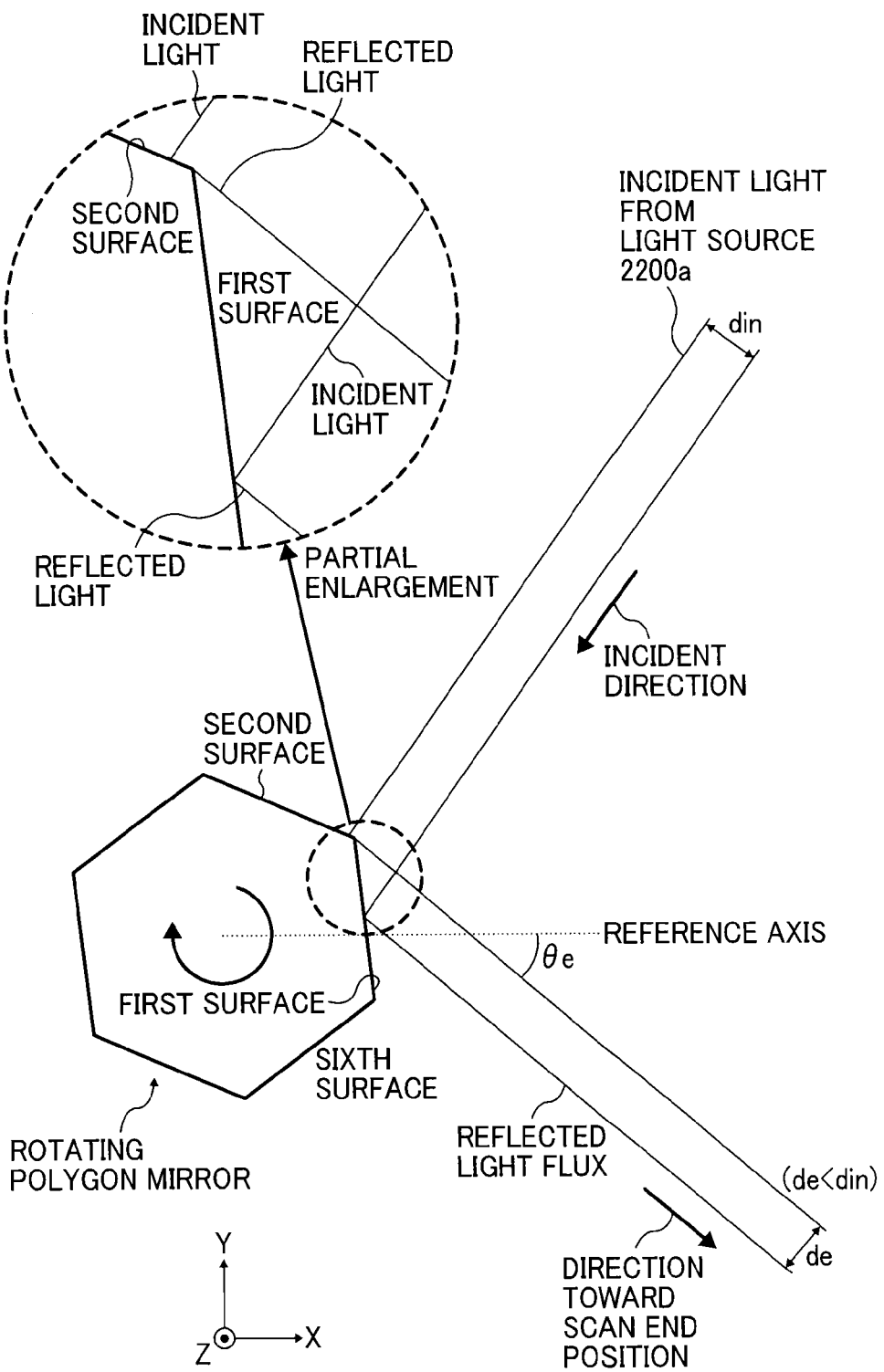
FIG. 18 illustrates incident light flux and reflected light flux relative to the rotating polygon mirror when light flux emitted from the light source and deflected by the light deflector is directed onto the scan end position in the scan area of the photoreceptor drum.

FIG. 18 illustrates incident light flux and reflected light flux relative to the rotating polygon mirror when light flux deflected by the light deflector 2104 is directed onto the scan end position in the scan area of the photoreceptor drum 2030a. At this time, all the light flux incident to the light deflector 2104 is not incident to the first surface of the rotating polygon mirror, but a part of the light flux incident to the light deflector 2104 is configured to be incident to the second surface.

Specifically, the light deflector 2104 cancels a part of the incident light flux. As illustrated in FIG. 18, an angle formed by a forwarding direction of the light flux reflected by the first surface of the rotating polygon mirror and the reference axis is denoted as θe.

As a result, a width de of the light flux reflected by the first surface of the rotating polygon mirror and directed onto the scan end position of the photoreceptor drum 2030a is smaller than a width din of the light flux incident to the light deflector 2104.

More specifically, the scan start position in the scan area of the photoreceptor drum 2030a resides at +Y side end position of the scan area relative to the main scanning direction and the scan end position in the scan area of the photoreceptor drum 2030a resides at −Y side end position of the scan area relative to the main scanning direction.

Note that the light flux emitted from the light source 2200b and directed onto the scan area of the photoreceptor drum 2030b performs similarly to the light flux emitted from the light source 2200a and directed onto the scan area of the photoreceptor drum 2030a.

When the incident light flux is cancelled by the light deflector 2104, so-called ghost light of an adjacent surface may return to the light source or may be forwarded to the scan area. When such adjacent surface ghost light returns to the light source, the light source auto power control (APC) may become unstable. When such adjacent surface ghost light is directed onto the scan area, the image comes to include noise, so that the image quality is degraded.

Figure 19:
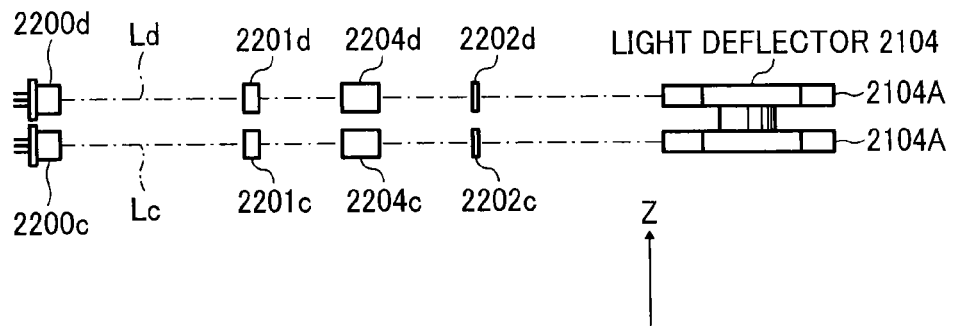
FIG. 19 is a view illustrating a horizontal incidence.

FIG. 19 illustrates a case in which the light flux from the light source 2200d horizontally enters the light deflector, the light flux from the light source 2200d enters two adjacent deflection surfaces (that is, the first deflection surface and the second deflection surface) of the rotating polygon mirror having each inner angle α, and the light flux reflected by the first deflection surface becomes the synchronization light flux Ld. In this case, as illustrated in FIG. 20, when the incident direction of the light flux from the light source 2200d is orthogonal to the second deflection surface, the light flux or the adjacent surface ghost light returns to the light source 2200d.

Specifically, a following equation (1) stands geometrically. For simplifying purpose, |θin|+|θBD| is set to A.

$$\alpha + \beta + A + 90 = 360 \qquad (1)$$

Figure 20:
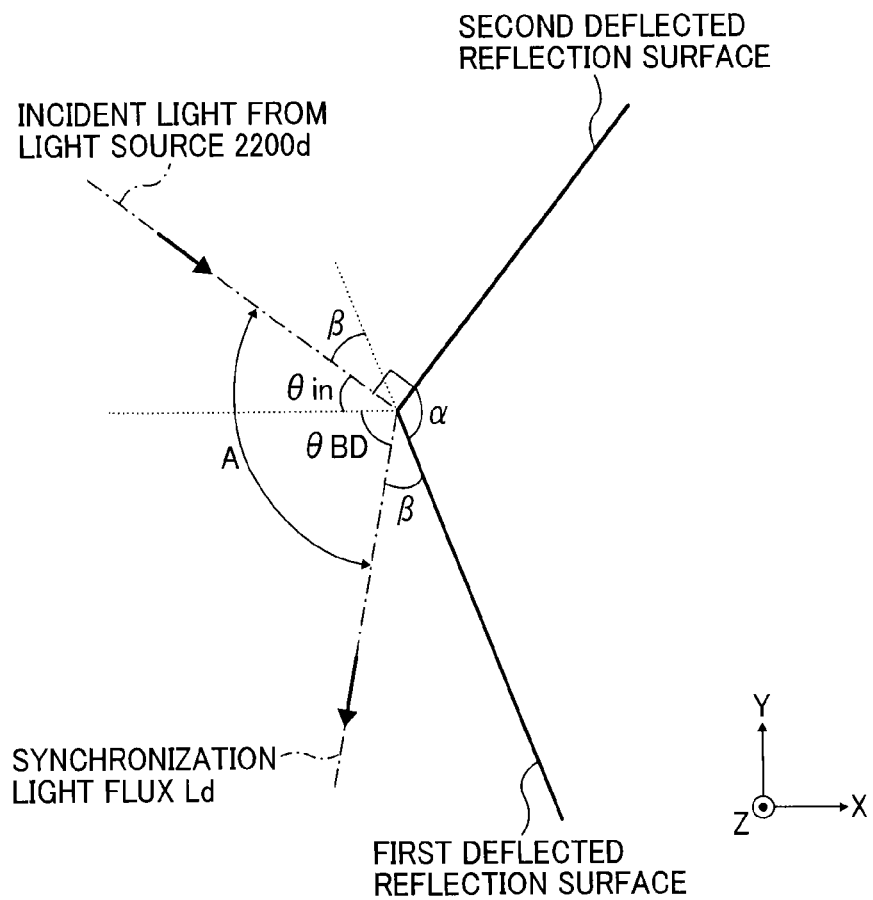
FIG. 20 illustrates a relation between |θin|+|θBD| and a number N of surfaces of the rotating polygon mirror.

An angle β as depicted in FIG. 20 is represented by a following equation (2).

$$\beta = (180 - A)/2 \qquad (2)$$

Because the rotating polygon mirror includes N deflection surfaces, a as depicted in FIG. 20 can be expressed by a following equation (3). (N is an integer.)

$$\alpha = \{180 \times (N-2)\}/N \qquad (3)$$

By substituting above equations (2) and (3) into the equation (1), a following equation (4) is obtained.

$$A = 720/N \qquad (4)$$

Specifically, when the amount |θin|+|θBD| equals to 720/N, the adjacent surface ghost light returns to the light source 2200d. Accordingly, in the horizontal incidence, |θin|+|θBD| should not equal to 720/N, which restricts a layout of the synchronization optical system.

On the other hand, when the light flux from the light source 2200d is obliquely incident to the rotating polygon mirror according to the present embodiment, even though the amount |θin|+|θBD| is equal to 720/N, the adjacent surface ghost light does not return to the light source 2200d. Accordingly, layout restriction does not adversely affect the synchronization optical system.

Because, in the present embodiment, the absolute values of oblique incidence angles of the light flux Lc and of the light flux Ld incident to the rotating polygon mirror are the same, there is a possibility that the adjacent surface ghost light may direct to the light source 2200c; however, the light source 2200c is not powered on when the synchronization is detected, and no inconvenience will be invoked.

Further, in the present embodiment, a following inequality (5) is satisfied so that the adjacent surface ghost light does not direct to the scan area when the light flux deflected by the light deflector 2104 is directed onto the synchronization detection sensor 2115B. Herein, an angle formed by a forwarding direction of the light flux reflected by the adjacent surface ghost light and the reference axis is greater than θe.

$$|\theta BD|+|\theta e|<720/N \tag{5}$$

Further, in the present embodiment, a following inequality (6) is satisfied. Herein, an angle formed by a forwarding direction of the adjacent surface ghost light and the reference axis is smaller than θin. When the angle formed by the forwarding direction of the adjacent surface ghost light and the reference axis is greater than θin, the scanning angle is reduced and the optical path length from the light deflector 2104 to the photoreceptor drum is elongated.

$$|\theta in|+|\theta BD|>720/N \tag{6}$$

The above inequalities (5) and (6) can be satisfied if the synchronization detection sensor 2115B is disposed so that a following formula (7) is satisfied.

$$720/N-|\theta in|<|\theta BD|<720/N-|\theta e| \tag{7}$$

Figure 21:
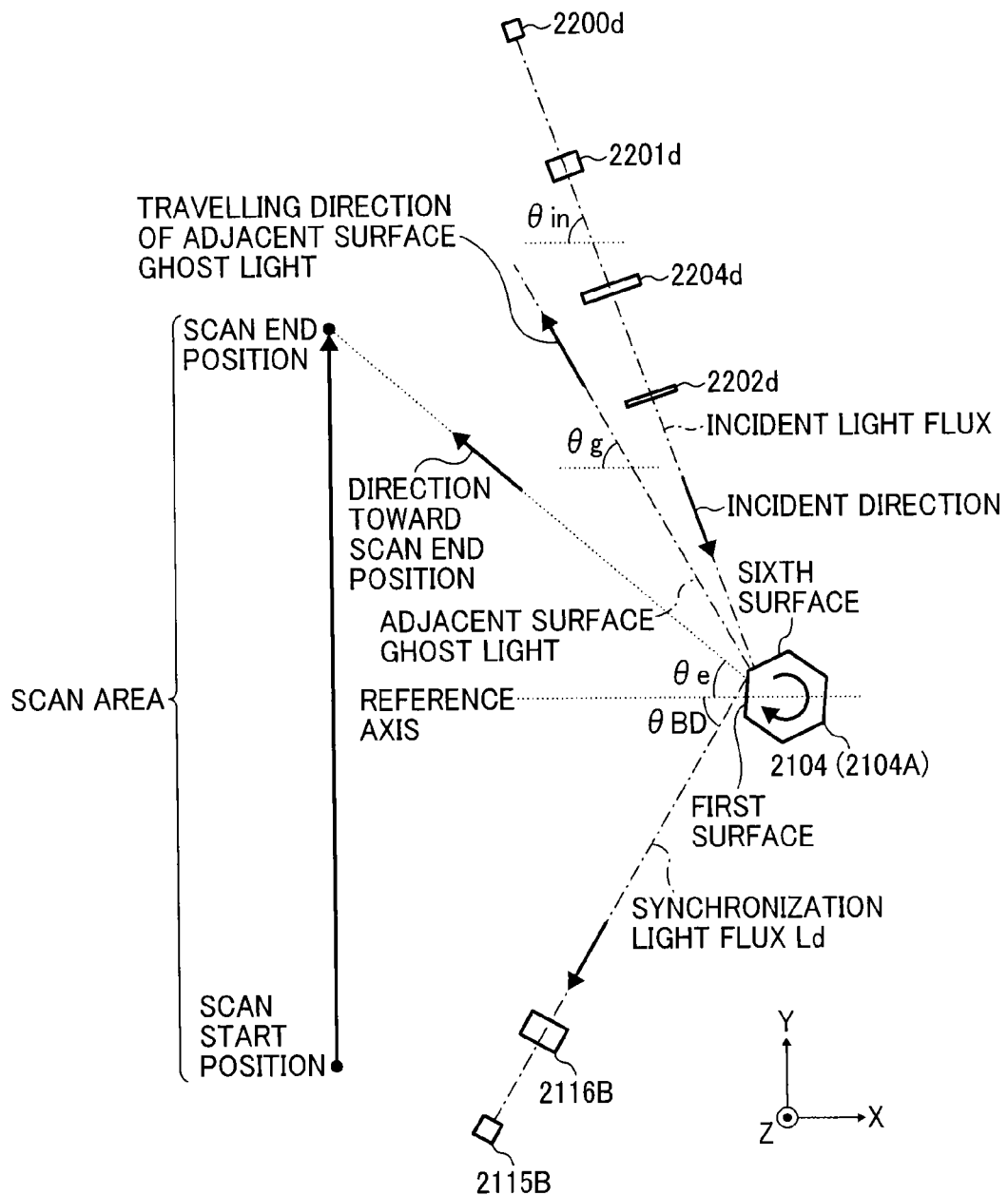
FIG. 21 illustrates a relation among a forwarding direction of the adjacent surface ghost light, an incidence direction of the light flux incident to the light deflector, and the scan area when the light flux emitted from the light source and deflected by the light deflector before the scanning start is received by the synchronization detection sensor.

FIG. 21 illustrates a relation among a forwarding direction of the adjacent surface ghost light, an incidence direction of the light flux incident to the light deflector 2104, and the scan area when the light flux emitted from the light source 2200d and deflected by the light deflector 2104 before the scanning start is received by the synchronization detection sensor 2115B.

Figure 22:
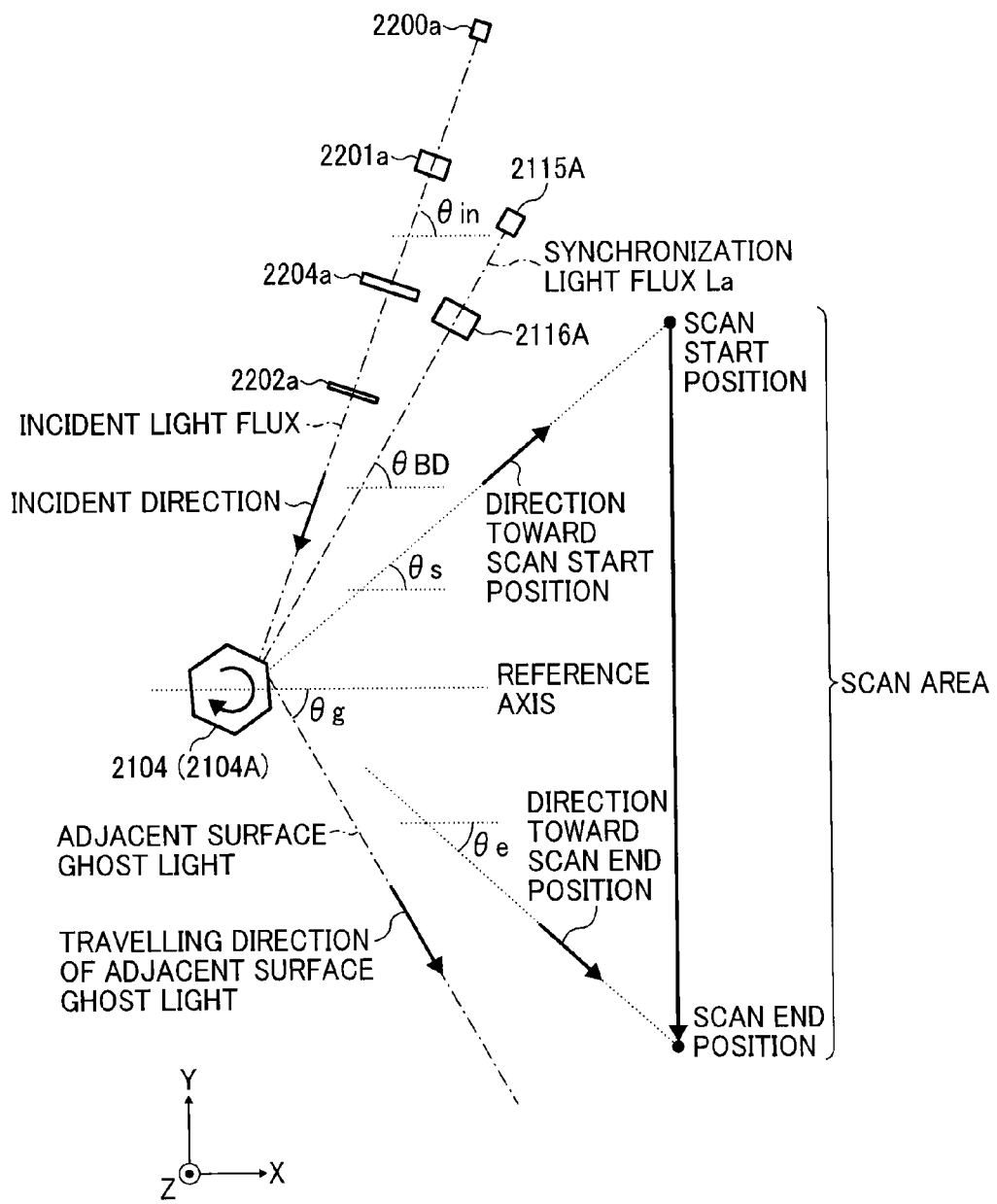
FIG. 22 illustrates a relation among a forwarding direction of the adjacent surface ghost light, an incidence direction of the light flux incident to the light deflector, and the scan area when the light flux emitted from the light source and deflected by the light deflector before the scanning start is received by the synchronization detection sensor.

Suppose that the angle formed by a forwarding direction of the adjacent surface ghost light and the reference axis is set to θg, a relation |θe|<|θg|<|θin| stands, so that the adjacent surface ghost light does not return to the light source nor direct to the scan area. FIG. 22 illustrates a relation among a forwarding direction of the adjacent surface ghost light, an incidence direction of the light flux incident to the light deflector 2104, and the scan area when the light flux emitted from the light source 2200a and deflected by the light deflector 2104 before the scanning start is received by the synchronization detection sensor 2115A. In this case also, the above formulae (5) and (6) are satisfied. Because the relation |θe|<|θg|<|θin| also stands, the adjacent surface ghost light does not return to the light source nor direct to the scan area.

Further, there is a concern that the adjacent surface ghost light is directed onto the light source when the light flux emitted from the light source 2200d and deflected by the light deflector 2104 is directed onto the scan start position in the scan area of the photoreceptor drum 2030d.

Then, suppose that the light flux from the light source 2200d horizontally enters the rotating polygon mirror and is incident to two adjacent deflection surface (i.e., the first deflection surface and the second deflection surface) of the rotating polygon mirror having an internal angle α, and that the light flux reflected by the first deflection surface is directed onto the scan start position.

Figure 23:
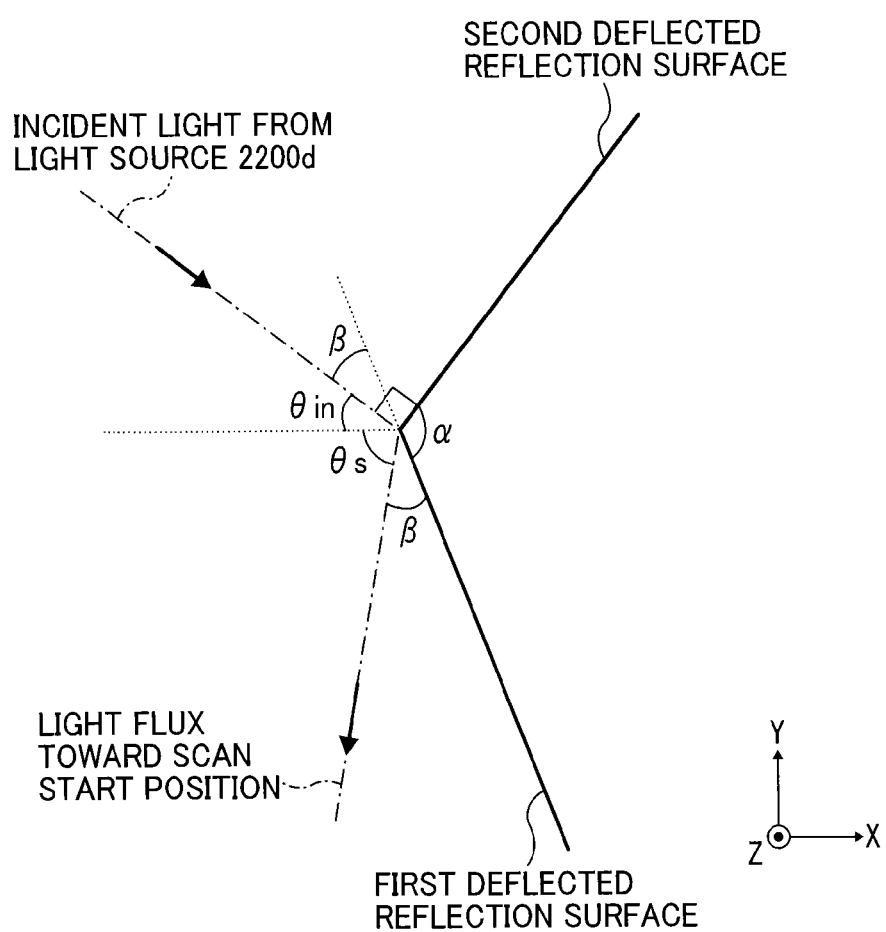
FIG. 23 illustrates a relation between |θin|+|θBD| and the number N of surfaces of the rotating polygon mirror.

In such a timing, as illustrated in FIG. 23, when the incident direction of the light flux from the light source 2200d is orthogonal to the second deflection surface, the light flux or the adjacent surface ghost light reflected by the second deflection surface becomes a returning light to the light source 2200d.

Specifically, when the amount |θin|+|θs| is equal to 720/N, the adjacent surface ghost light returns to the light source 2200d. On the other hand, when the light flux from the light source 2200d is obliquely incident to the rotating polygon mirror according to the present embodiment, the adjacent surface ghost light does not return to the light source 2200d.

However, because in the present embodiment the absolute values of oblique incidence angles of the light flux Lc and of the light flux Ld incident to the rotating polygon mirror are the same, there is a possibility that the adjacent surface ghost light may be directed onto the light source 2200c.

Therefore, the present optical system according to the present embodiment is configured to satisfy a following inequality (8).

$$|\theta in|+|\theta s|<720/N \tag{8}$$

In this case, there is no concern that the adjacent surface ghost light is directed onto the light source 2200c when the light flux emitted from the light source 2200d and deflected by the light deflector 2104 is directed onto the scan start position in the scan area of the photoreceptor drum 2030d. Similarly, there is no concern that the adjacent surface ghost light is directed onto the light source 2200d when the light flux emitted from the light source 2200c and deflected by the light deflector 2104 is directed onto the scan start position in the scan area of the photoreceptor drum 2030c.

Further, there is a concern that the adjacent surface ghost light is directed onto the light source 2200b when the light flux emitted from the light source 2200a and deflected by the light deflector 2104 is directed onto the scan end position in the scan area of the photoreceptor drum 2030a.

Therefore, the present optical scanning device according to the present embodiment is configured to satisfy a following inequality (9).

$$|\theta in|+|\theta e|<720/N \tag{9}$$

When the above inequality (9) is satisfied, there is no concern that the adjacent surface ghost light is directed onto the light source 2200b when the light flux emitted from the light source 2200a and deflected by the light deflector 2104 is directed onto the scan end position in the scan area of the photoreceptor drum 2030a. Further, there is no concern that the adjacent surface ghost light is directed onto the light source 2200a when the light flux emitted from the light source 2200b and deflected by the light deflector 2104 is directed onto the scan end position in the scan area of the photoreceptor drum 2030b.

Suppose that an angle formed between the forwarding direction of the light flux and the reference axis when the light flux deflected by the light deflector 2104 is directed onto the scan area of the photoreceptor drum is collectively defined as θi. Then, a following inequality (10) is satisfied in the present embodiment.

$$|\theta in|+|\theta i|<720/N \tag{10}$$

In the conventional UF-type optical scanning device to cope with higher-speed image formation and higher pixel density, a length of the deflection surface needs to be larger relative to the direction corresponding to the main scanning direction, so that the rotating polygon mirror includes fewer deflection surfaces or the diameter of the inscribed circle is increased.

However, if the number of deflection surfaces is reduced, rotation speed of the rotating polygon mirror needs to be increased to compensate for the reduced number of deflection surfaces. On the other hand, when the diameter of the inscribed circle is increased, windage loss of the rotating polygon mirror is increased, thereby increasing power consumption. Further, increasing the number of light sources to increase the number of beams deflected by a single deflection surface may result in enlarging a drive circuit and thus increasing production costs.

In the conventional OF-type optical scanning device employed to cope with higher speed image formation and higher pixel density, a rotating polygon mirror having more than 10 deflection surfaces needs be used, which may result in less scanning angle and make the optical scanning device larger. In addition, because a peripheral portion of the light flux is not used, efficiency in the use of light is degraded.

The optical scanning device 2010 according to the present embodiment may employ (1) a smaller rotating polygon mirror than the conventional UF type optical scanning device. As a result, without increasing power consumption, the rotating polygon mirror can rotate at a high speed. In addition, without increasing the number of light sources, that is, without increasing costs, the optical scanning device 2010 deals with higher speed image formation and higher pixel density.

The optical scanning device 2010 according to the present embodiment can (2) enlarge the scanning angle than the conventional OF-type optical scanning device. As a result, without making the device larger, the optical scanning device 2010 can cope with higher speed image formation and higher pixel density.

As described above, the optical scanning device 2010 according to the present embodiment includes four light sources (2200*a*, 2200*b*, 2200*c*, and 2200*d*), an optical system before a deflector, a light deflector 2104 having a rotating polygon mirror 2104A, two synchronization detection sensors (2115A and 2115B), and a scanning optical system.

The light flux incident to the light deflector 2104 is configured not to be canceled by the light deflector 2104 when the light flux deflected by the light deflector 2104 is directed onto the synchronization detection sensor and directed onto each end portion of the scan area. The light flux incident to the light deflector 2104 is configured to be not canceled by the light deflector 2104 when the light flux deflected by the light deflector 2104 is directed onto the center position of the scan area.

The light flux La from the light source 2200*a* and the light flux Lb from the light source 2200*b* are configured to obliquely enter into the same deflection surface of the rotating polygon mirror and the light flux Lc from the light source 2200*c* and the light flux Ld from the light source 2200*d* are configured to obliquely enter into the same deflection surface of the rotating polygon mirror. The light flux La and the light flux Ld are configured to obliquely enter from one side of the plane perpendicular to the rotation axis of the rotating polygon mirror and the light flux Lb and the light flux Lc are configured to obliquely enter from the other side of the plane perpendicular to the rotation axis of the rotating polygon mirror.

Then, the above formulae (5), (6), (8), and (9) are satisfied.

With the configuration as described above, (1) the scanning angle may be enlarged, the optical path length from the light deflector to the photoreceptor drum is thus shortened, so that the optical scanning device may be more compact; (2) the rotating polygon mirror or the inscribed circle of the rotating polygon mirror may be reduced in size, so that the scanning speed can be increased; (3) the rotating polygon mirror or the inscribed circle of the rotating polygon mirror may be reduced in size, so that degradation of optical performance due to the oblique incidence method is minimized compared to the conventional UF-type device; (4) compared to the rotating polygon mirror of two-step type used for the horizontal incidence method, one-step rotating polygon mirror may be used in the oblique incidence method, so that the rotating polygon mirror is produced at low cost and the higher speed can be obtained because of less windage loss; and (5) if the same number of light sources are used and the same speed is used for scanning, the rotating polygon mirror can be more compact, thereby reducing the power consumption and the amount of heat generation. Furthermore, rise of the temperature, deformation, and degradation of the optical performance of the optical housing and elements due to the temperature rise of the light deflector may be minimized. As a result, the image quality or latent image quality is prevented from degrading.

According to the optical scanning device 2010, without degrading the image quality, a low cost, more compact and higher-speed device can be provided.

Because the multifunction apparatus 2000 is provided with such an optical scanning device 2010, as a result, a low cost, more compact, and higher-speed apparatus can be provided without degrading the image quality.

In the above embodiment, a case in which the incident light flux is canceled by the light deflector 2104 at both timings in which the incident light flux is toward the scan start position and the scan end position in the scan area, has been described; however, the case is not limited to this, and the incident light flux may be canceled by the light deflector 2104 at either timing to be directed onto the scan start position or the scan end position in the scan area.

Further, in the above embodiment, a case in which the diameter of the circle inscribed in the rotating polygon mirror is 18 mm has been described, but the present invention is not limited to this. The diameter of the circle inscribed in the rotating polygon mirror can be set in accordance with the required half scanning angle.

Further, in the above embodiment, a case in which six mirror surfaces are formed in the rotating polygon mirror has been described, but the present invention is not limited to this. For example, the rotating polygon mirror may include seven mirror surfaces.

Further, as illustrated in FIG. 24 as an example, the angle of the oblique incidence angle of the light flux La and the light flux Lb may be configured to be different; and as illustrated in FIG. 25 as another example, the angle of the oblique incidence angle of the light flux Lc and the light flux Ld may be configured to be different. In this case, following inequalities (11) and (12) are satisfied instead of the above inequalities (8) and (9), thereby further increasing the scanning angle.

$$|\theta in|+|\theta s|\geq 720/N \tag{11}$$

$$|\theta in|+|\theta e|\geq 720/N \tag{12}$$

Figure 26A:
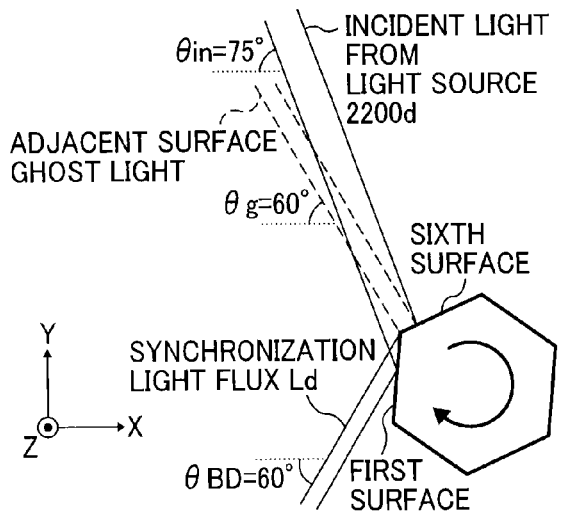
FIGS. 26A to 26C each illustrate a first example of a rotating polygon mirror.
Figure 26B:
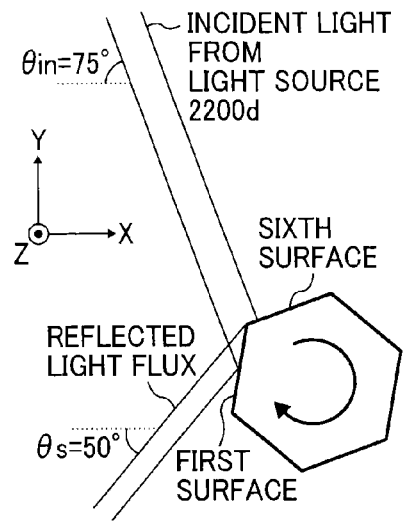
Figure 26C:
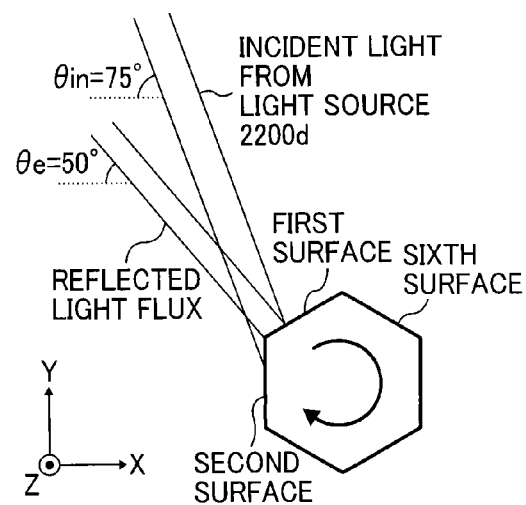

FIGS. 26A to 26C illustrate a first example. In the first example, |θin|=75°, |θBD|=60°, |θs|=50°, and |θe|=50°.

As a result, 720/N=120, |θin|+|θBD|=135°, |θin|+|θs|=125°, |θBD|+|θe|=110°, and |θin|+|θe|=125°, and the above formulae (5), (6), (11), and (12) are satisfied.

Further, an angle θg formed by the forwarding direction of the adjacent surface ghost light and the reference axis is 60° when the light flux deflected by the light deflector 2104 is directed onto the synchronization detection sensor 2115B. That is, θg<θin.

Figure 27A:
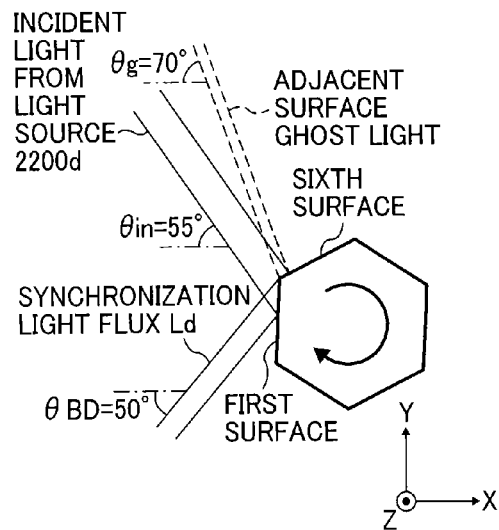
FIGS. 27A to 27C each illustrate a first comparative example.
Figure 27B:
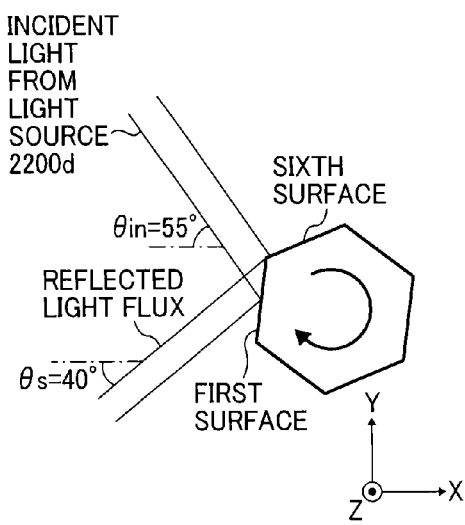
Figure 27C:
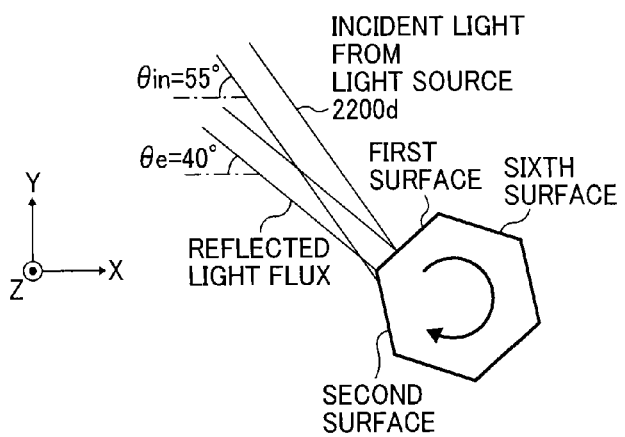

FIGS. 27A to 27C illustrate a first comparative example. In the first comparative example, |θin|=55°, |θBD|=50°, |θs|=40°, and |θe|=40°.

As a result, 720/N=120, |θin|+|θBD|=105°, |θin|+|ηs|=95°, |θBD|+|θe|=90°, and |θin|+|θe|=95°, and the above formula (5) is satisfied, but the above formulae (6), (11), and (12) are not satisfied.

Further, an angle θg formed by the forwarding direction of the adjacent surface ghost light and the reference axis is 70° when the light flux deflected by the light deflector 2104 is directed onto the synchronization detection sensor 2115B. That is, θg>θin.

In the above example 1, |θs| and |θe| are each larger compared to the first comparative example, so that the optical path length from the light deflector 2104 to the photoreceptor drum can be shortened. As a result, the optical scanning device can be made more compact.

Figure 28A:
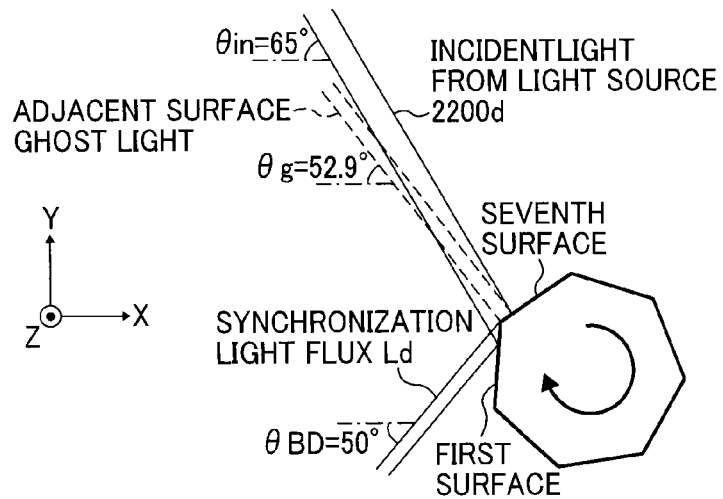
FIGS. 28A to 28C each illustrate a second example of a rotating polygon mirror that has seven surfaces.
Figure 28B:
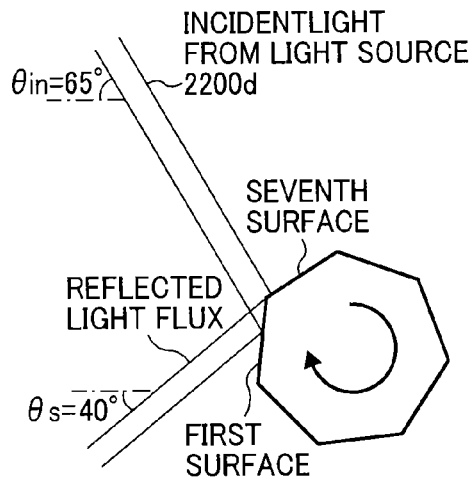
Figure 28C:
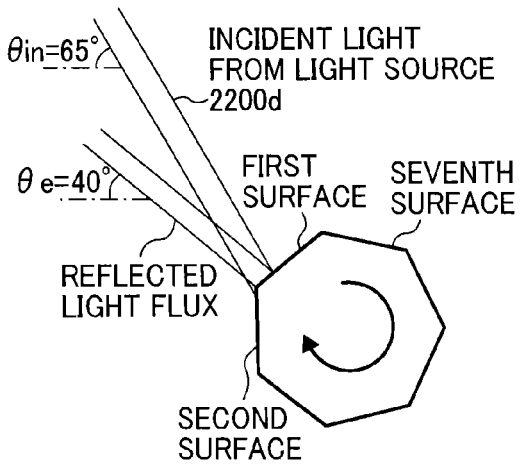

FIGS. 28A to 28C illustrate a second example in which the rotating polygon mirror includes seven mirror surfaces. In the second example, |θin|=65°, |θBD|=50°, |θs|=40°, and |θe|=40°.

As a result, 720/N≈102.9, |θin|+|θBD|=115°, |θin|+|θs|=105°, |θBD|+|θe|=90°, and |θin|+|θe|=105°, and the above formulae (5), (6), (11), and (12) are satisfied.

Further, an angle θg formed by the forwarding direction of the adjacent surface ghost light and the reference axis is 52.9° when the light flux deflected by the light deflector 2104 is directed onto the synchronization detection sensor 2115B. Specifically, because the relation |θe|<|θg|<|θin| stands, the adjacent surface ghost light is not directed onto the scan area.

Figure 29A:
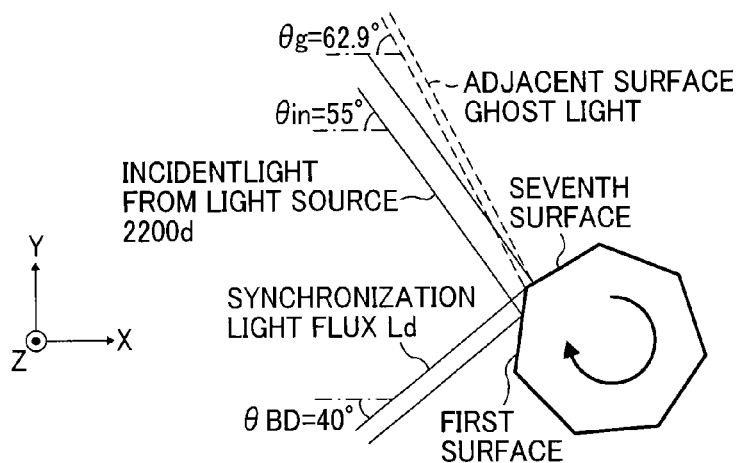
FIGS. 29A to 29C each illustrate a second comparative example of a rotating polygon mirror that has seven surfaces.
Figure 29B:
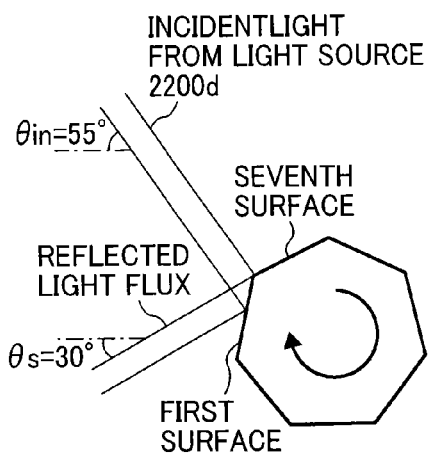
Figure 29C:
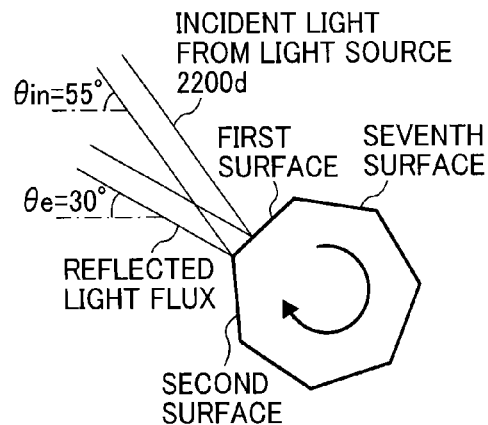

FIGS. 29A to 29C illustrate a second comparative example in a case in which the rotating polygon mirror includes seven mirror surfaces. In the second comparative example, |θin|=55°, |θBD|=40°, |θs|=30°, and |θe|=30°.

In this case, 720/N≈102.9, |θin|+|θBD|=95°, |θin|+|θs|=85°, |θBD|+|θe|=70°, and |θin|+|θe|=85°. The above formula (5) is satisfied, but the above formulae (6), (11), and (12) are not satisfied.

Further, an angle θg formed by the forwarding direction of the adjacent surface ghost light and the reference axis is 62.9° when the light flux deflected by the light deflector 2104 is directed onto the synchronization detection sensor 2115B. That is, θg>θin.

In the above example 2, |θs| and |θe| each are larger compared to the second comparative example, so that the optical path length from the light deflector 2104 to the photoreceptor drum can be shortened. As a result, the optical scanning device can be made more compact.

Further, as illustrated in FIG. 30 as an example, the light flux La and the light flux Lb incident to the light deflector 2104 may be configured to intersect at a position different from the same deflection surface; and as illustrated in FIG. 31 as an example, the light flux Lc and the light flux Ld may be configured to intersect at a position different from the same deflection surface.

In this case, an incidence position of the light flux La and that of the light flux Lb on the deflection surface are separated relative to the Z-axis, and the incidence position of the light flux Lc and that of the light flux Ld on the deflection surface are separated relative to the Z-axis. With such a structure, the adjacent surface ghost light is not directed onto the other light source, so that the above formulae (11) and (12) can be satisfied instead of the above formulae (8) and (9). Then, the scanning angle can be further increased than in the above embodiment.

Figure 32:
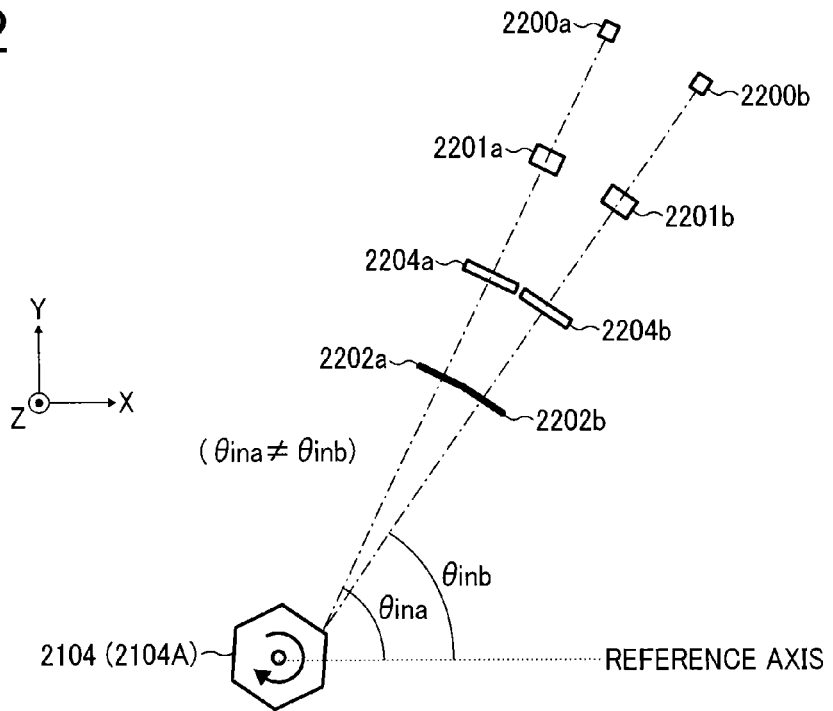
FIG. 32 further additionally illustrates the second modified example of the optical scanning device of FIG. 30.
Figure 33:
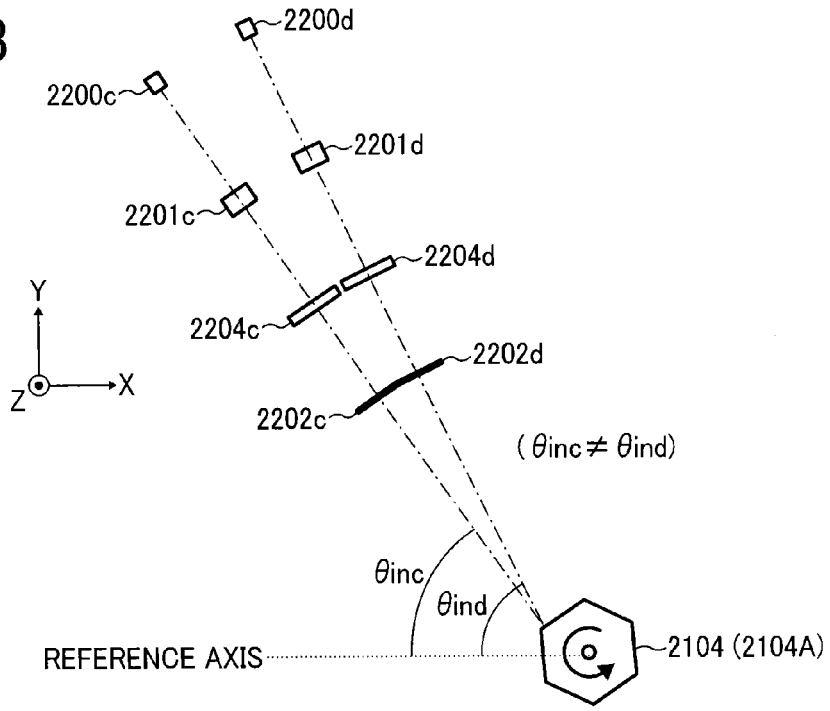
FIG. 33 illustrates a third modified example of the optical scanning device of FIG. 30.

In addition, as illustrated in FIG. 32 as an example, an angle θina formed between the forwarding direction of the light flux emitted from the light source 2200a and incident to the light deflector 2104 and the reference axis and an angle θinb formed between the forwarding direction of the light flux emitted from the light source 2200b and incident to the light deflector 2104 and the reference axis may be configured to be different. Further, as illustrated in FIG. 33 as an example, an angle θinc formed between the forwarding direction of the light flux emitted from the light source 2200c and incident to the light deflector 2104 and the reference axis and an angle θind formed between the forwarding direction of the light flux emitted from the light source 2200d and incident to the light deflector 2104 and the reference axis may be configured to be different.

If θina=75° and θinb=65°, the angle θg formed between the forwarding direction of the adjacent surface ghost light and the reference axis becomes 75° which is equal to θina when the angle formed between the light flux and the reference axis becomes 45° while the light flux from the light source 2200a scans the scan area. However, because the light flux La is obliquely incident to the light deflector 2104, the adjacent surface ghost light does not return to the light source 2200a. Furthermore, because θina and θinb are different, the adjacent surface ghost light is not directed onto the light source 2200b.

In this case, the above formulae (11) and (12) are satisfied instead of the above formulae (8) and (9). Then, the scanning angle can be further increased than in the above embodiment.

In the above embodiment, a case in which |θs|=|θe| has been described, but the present invention is not limited to this.

The light source may employ a monolithic edge surface laser array or surface emission laser array.

In the above embodiment, a case in which four photoreceptor drums are provided has been described, but the present invention is not limited to this.

In the above embodiment, a case in which a multifunction apparatus is used as an image forming apparatus has been described, but the present invention is not limited to this. The present invention may also be applied to a copier, a printer, or a facsimile machine.

The present invention may also be applied to an image forming apparatus employing a laser light and a medium (or a sheet) which can be colored by direct radiation of the laser light.

The present invention may also be applied to an image forming apparatus employing a silver salt film as an image carrier. In this case, a latent image is formed on the silver salt film by optical scanning, and the thus-formed latent image can be rendered visible by the same process as in the developing process in the normal silver salt photographic process. Further, the developed image can be transferred to a photographic paper by the same process as in the printing process in the normal silver salt photographic process. Such an image forming apparatus may be used as an optical proofing device or as an optical writing device to draw a CT scan image.

According to the optical scanning device of the present invention, a more compact and higher-speed device can be provided without degrading image quality.

Additional modifications and variations of the present invention are possible in light of the above teachings. It is therefore to be understood that, within the scope of the appended claims, the invention may be practiced other than as specifically described herein.

What is claimed is:

1. An optical scanning device comprising:
   a light source to emit light flux;
   a synchronization detection sensor; and
   a rotating polygon mirror having a plurality of reflective surfaces,
   the optical scanning device configured to scan a scan area of a surface in a main scanning direction with the light flux emitted from the light source and reflected by the rotating polygon mirror,
   wherein:
   with the light flux orthogonally projected onto a plane perpendicular to a rotation axis of the rotating polygon mirror, a width of the light flux that enters the rotating polygon mirror is smaller than a length in the main scanning homologous direction of the reflective surface of the rotating polygon mirror,
   all the light flux incident to the rotating polygon mirror enters a center position of a first reflective surface and is reflected by the first reflective surface when light flux deflected by the rotating polygon mirror is directed onto a center position of the scan area, when the light flux deflected by the rotating polygon mirror is directed onto a scan start position of the scan area, the light flux is at least partly incident on the first reflective surface at a first end of the first reflective surface, when the light flux deflected by the rotating polygon mirror is directed onto a scan end position of the scan area, the light flux is at least partly incident on the first reflective surface at a second end of the first reflective surface that is opposite to the first end, a part of the light flux incident to the rotating polygon mirror is reflected by a second reflective surface adjacent to the first reflective surface when the light flux reflected by the rotating polygon mirror is directed onto at least one end of both ends of the scan area, and the rest of the light flux is reflected by the first reflective surface, the polygon mirror is configured so that the part of the light flux is reflected by the second reflective surface is not reflected to any of the light source, the scan area, or the synchronization detection sensor, the light flux incident to the rotating polygon mirror obliquely enters the plane orthogonal to the rotation axis of the rotating polygon mirror, before a start of scanning synchronously, when the light flux enters the synchronization sensor, the light flux enters both a first reflective surface and a second reflective surface adjacent to the first reflective surface of the rotating polygon mirror, the light flux reflected by the first reflective surface of the rotating polygon mirror enters the synchronization sensor and the light flux reflected by the second reflective surface does not enter the synchronization sensor, when the light flux is orthogonally projected onto a plane perpendicular to the rotation axis of the rotating polygon mirror, an angle θBD formed between a forwarding direction of the light flux reflected by the first reflective surface and a direction of the axis perpendicular to the main scanning direction satisfies an inequality $|\theta BD|+|\theta e|<720/N$, where N is the number of reflective surfaces of the rotating polygon mirror, and θe is an angle formed between a direction of reflection of the light flux at the rotating polygon mirror, heading for a scan end position of the scan area and the axial direction which is perpendicular to the main scanning direction.

2. The optical scanning device as claimed in claim 1, wherein with the light flux orthogonally projected onto a plane perpendicular to the rotation axis of the rotating polygon mirror, either of following inequalities is satisfied:

$|\theta in|+|\theta s|\geq 720/N$ or $|\theta in|+|\theta e|\geq 720/N$, where θin is an angle formed by an incident direction of the light flux incident to the rotating polygon mirror and an axis perpendicular to the main scanning direction, N is the number of reflective surfaces of the rotating polygon mirror, θe is an angle formed with the light flux reflected by the reflective surface of the rotating polygon mirror directed onto a scan end position of the scan area and the axis, and θs is an angle formed with the light flux reflected by the reflective surface of the rotating polygon mirror directed onto a scan start position of the scan area and the axis.

3. The optical scanning device as claimed in claim 1, wherein:

a first light flux and a second light flux are incident to the same reflective surface of the rotating polygon mirror, the first light flux obliquely enters from a first side of a plane perpendicular to the rotation axis of the rotating polygon mirror and the second light flux obliquely enters from a second side of the plane perpendicular to the rotation axis of the rotating polygon mirror, the oblique incidence angles of the first and second light fluxes have the same absolute value, the first light flux and the second light flux intersect on the same reflective surface, and when the first light flux and the second light flux are orthogonally projected to the plane perpendicular to the rotation axis of the rotating polygon mirror, either of the following inequalities is satisfied $|\theta in|+|\theta s|<720/N$ or $|\theta in|+|\theta e|<720/N$, where θin is an angle formed by an incident direction of the light flux incident to the rotating polygon mirror and the axis perpendicular to the main scanning direction, N is the number of reflective surfaces of the rotating polygon mirror, θe is an angle formed with the light flux reflected by the reflective surface of the rotating polygon mirror directed onto a scan end position of the scan area and the axis, and θs is an angle formed with the light flux reflected by the reflective surface of the rotating polygon mirror directed onto a scan start position of the scan area and the axis.

4. The optical scanning device as claimed in claim 1, wherein:

a first light flux and a second light flux are incident to the same reflective surface of the rotating polygon mirror, the first light flux enters from a first side of a plane perpendicular to the rotation axis of the rotating polygon mirror and the second light flux enters from a second side of the plane perpendicular to the rotation axis of the rotating polygon mirror, the first light flux and the second light flux intersect on the same reflective surface, and the oblique incidence angles of the first and second light fluxes have different absolute values.

5. The optical scanning device as claimed in claim 1, wherein:

a first light flux and a second light flux are incident to the same reflective surface of the rotating polygon mirror, the first light flux enters from a first side of a plane perpendicular to the rotation axis of the rotating polygon mirror and the second light flux enters from a second side of the plane perpendicular to the rotation axis of the rotating polygon mirror, oblique incidence angles of the first and second light fluxes have the same absolute value, and the first light flux and the second light flux intersect at a position different from the same reflective surface.

6. The optical scanning device as claimed in claim 1, wherein:

a first light flux and a second light flux are incident to the same reflective surface of the rotating polygon mirror, the first light flux enters from a first side of a plane perpendicular to the rotation axis of the rotating polygon mirror and the second light flux enters from a second side of the plane perpendicular to the rotation axis of the rotating polygon mirror, and with the light orthogonally projected onto the plane perpendicular to the rotation axis of the rotating polygon mirror, an angle formed between the incident direction of the first light flux incident to the rotating polygon mirror and the axis perpendicular to the main scanning direction and an angle formed by the incident direction of the second light flux and the axis are different.

7. An image forming apparatus comprising:
an image carrier; and
the optical scanning device according to claim 1, to scan the image carrier with light flux modulated by image information.

* * * * *